United States Patent [19]

Roberts

[11] Patent Number: 5,037,286
[45] Date of Patent: Aug. 6, 1991

[54] INCINERATION RESIDUE TREATMENT APPARATUS

[75] Inventor: William A. Roberts, Berwyn, Pa.

[73] Assignee: Rolite, Inc., Wayne, Pa.

[21] Appl. No.: 366,158

[22] Filed: Jun. 14, 1989

Related U.S. Application Data

[63] Continuation-in-part of Ser. No. 211,267, Jun. 24, 1988, abandoned.

[51] Int. Cl.$^5$ .............................................. B28B 11/04
[52] U.S. Cl. .................................... 425/222; 23/313 R; 106/709; 118/418; 264/117; 264/333; 427/212
[58] Field of Search ..................... 264/112, 117, 333; 106/703, 709; 425/222; 23/313 R; 427/212, 214, 215; 118/418

[56] References Cited

U.S. PATENT DOCUMENTS

| | | | |
|---|---|---|---|
| 1,528,851 | 3/1925 | Rodling et al. | 23/313 R |
| 1,921,114 | 8/1933 | Brackelsberg | 23/313 R |
| 2,776,828 | 1/1957 | Marcellus et al. | 23/313 R |
| 2,860,598 | 11/1958 | Loesche | 425/222 |
| 3,189,434 | 6/1965 | Sackett, Sr. | 23/313 R |
| 3,192,060 | 6/1965 | Tilsen | 106/709 |
| 3,383,228 | 5/1968 | Rekate . | |
| 3,490,895 | 1/1970 | Svensson . | |
| 3,734,988 | 5/1973 | Aintablian . | |
| 3,804,750 | 4/1974 | Myers . | |
| 3,933,624 | 1/1976 | Myers . | |
| 3,980,558 | 9/1976 | Thompson . | |
| 3,988,258 | 10/1976 | Curtiss et al. . | |
| 4,017,417 | 4/1977 | Clark . | |
| 4,022,630 | 5/1977 | Watson . | |
| 4,046,674 | 9/1977 | Young . | |
| 4,064,831 | 12/1977 | Okawara . | |
| 4,101,501 | 7/1978 | Hinterwaldner . | |
| 4,113,413 | 9/1978 | Pietrusza . | |
| 4,116,705 | 9/1978 | Chappell . | |
| 4,122,028 | 10/1978 | Iffland . | |
| 4,142,912 | 3/1979 | Young . | |
| 4,209,335 | 6/1980 | Katayama . | |
| 4,226,631 | 10/1980 | Kubota . | |
| 4,237,814 | 12/1980 | Ormós et al. | 425/222 |
| 4,284,514 | 8/1981 | Wright . | |
| 4,304,674 | 12/1981 | Lazoysky . | |
| 4,329,179 | 5/1982 | Kutta . | |

(List continued on next page.)

FOREIGN PATENT DOCUMENTS 0208871 1/1987 Fed. Rep. of Germany .

OTHER PUBLICATIONS

E. Aleshin et al., Living with Marginal Aggregates, 1975, pp. 85-96.
K. R. Lauer et al., Proc. Fifth Mineral Waste Utilization, 1976, pp. 215-218.
K. J. Liles, Proc. Fifth Mineral Waste Utilization Symp., 1976, pp. 219-222.
A. H. Neal et al., Solid Waste Management and the Environment: The Mounting Garbage and Trash Crisis 1987.
F. N. Rubel, Incineration of Solid Wastes, 1974, pp. 62-67.

Primary Examiner—Mary Lynn Theisen
Attorney, Agent, or Firm—Paul & Paul

[57] ABSTRACT

Residue produced by incineration of commercial, industrial or municipal waste is treated on-site at the point of generation or storage. Moist residue, such as incinerator bottom ash, is mixed in a multi-segment rotary drum with a heavy metals treatment agent in a first section of the drum. An aggregation agent is added to the mixture, and the mixture separates under the shearing force imposed by the rotating drum into individual pieces which are rolled into balls. A cementitious coating material is added to coat the balls, and the coated balls are classified by size. The classified coated balls are conveyed to a bagging plant, where they are packaged in flexible containers formed from material selected to retard water loss, and tagged with identifying information. Toxic contaminants such as cadmium, lead and mercury are immobilized in the cured balls, which can be used as a construction aggregate. Leaching of heavy metals from the incinerator residue is strongly inhibited by the process.

5 Claims, 9 Drawing Sheets

U.S. PATENT DOCUMENTS

| | | |
|---|---|---|
| 4,331,088 | 5/1982 | Gold . |
| 4,336,069 | 6/1982 | Dodson et al. ............... 106/709 |
| 4,350,620 | 9/1982 | Hartinger . |
| 4,363,757 | 12/1982 | Koster ........................... 252/628 |
| 4,504,317 | 3/1985 | Smeltzer . |
| 4,530,723 | 7/1985 | Smeltzer . |
| 4,533,395 | 8/1985 | Vejmelka . |
| 4,601,832 | 7/1986 | Hooykaas . |
| 4,609,473 | 9/1986 | Ramachandran et al. ........ 23/313 R |
| 4,615,809 | 10/1986 | King . |
| 4,620,947 | 11/1986 | Carlson . |
| 4,623,459 | 11/1986 | Benaroya . |
| 4,623,469 | 11/1986 | Conner . |
| 4,629,509 | 12/1986 | O'Hara . |
| 4,652,404 | 3/1987 | Mallek et al. ................. 106/709 |
| 4,656,075 | 4/1987 | Mudge . |
| 4,664,957 | 5/1987 | van de Pol . |
| 4,669,397 | 6/1987 | Galgana . |
| 4,726,710 | 2/1988 | Rosar . |
| 4,741,776 | 5/1988 | Bye . |
| 4,741,834 | 5/1988 | Spangle . |
| 4,744,829 | 5/1988 | Eirich . |
| 4,800,024 | 1/1989 | Elfine . |

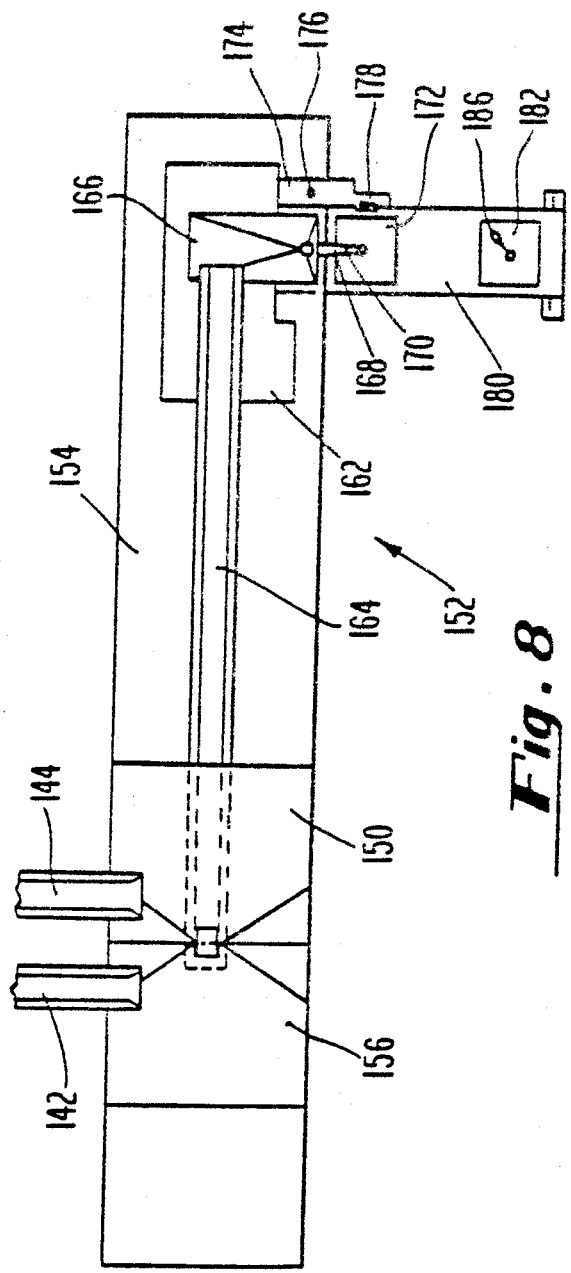
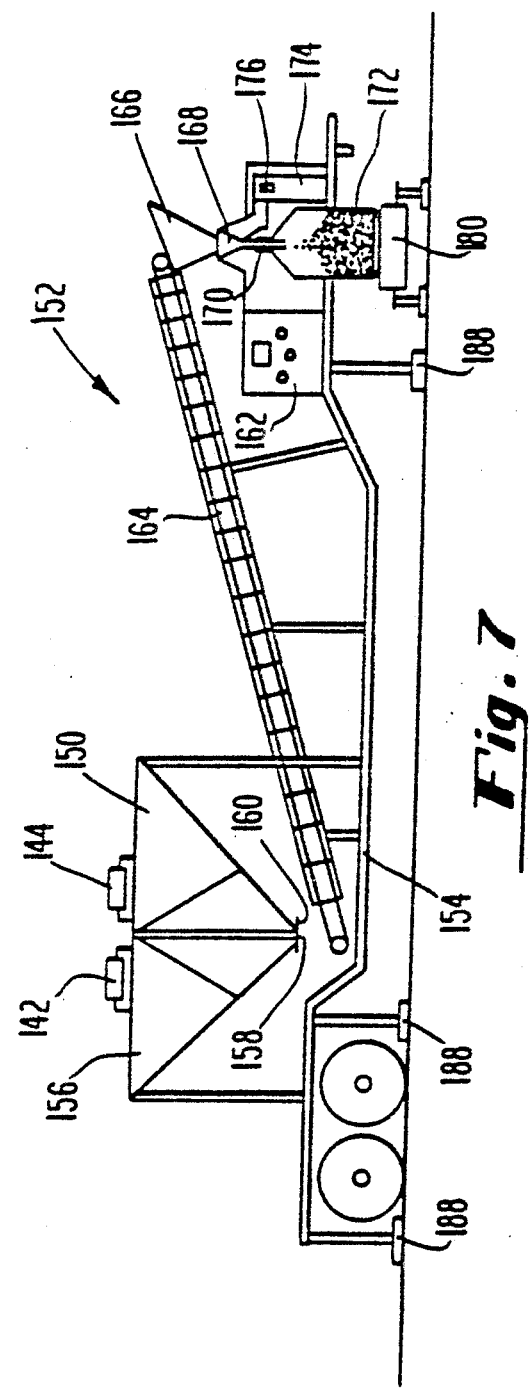

INCINERATION RESIDUE TREATMENT APPARATUS

CROSS REFERENCE TO RELATED APPLICATION

This is a continuation-in-part of copending U.S. patent application Ser. No. 211,267 filed June 24, 1988.

BACKGROUND OF THE INVENTION

1. Field of the Invention

The present invention relates to a process and apparatus for the treatment of waste materials, and in particular to a process and apparatus for the treatment of incinerator residue produced from commercial, industrial and municipal refuse, and to an aggregate material produced by that process

2. Background of the Invention

The problems associated with disposing of waste materials in an environmentally sound manner are well known. One of the serious concerns our consumption-oriented modern industrial society faces is what to do with municipal refuse. Traditional solutions, especially disposal of unprocessed refuse in landfills, are rapidly losing their viability, as acceptable disposal sites become increasingly difficult to find, and as such sites have become recognized as sources of unacceptable pollution of their environs. See, e.g., H. A. Neal et al., *Solid Waste Management and the Environment: The Mounting Garbage and Trash Crisis* (Prentice-Hall, Inc. Englewood Cliffs, N.J. 1987).

While raw municipal solid waste contains many materials that can be separated and recycled, there is always a residuum which must be somehow disposed of. One general approach to municipal waste disposal has been incineration, often now combined with cogeneration of power such as in modern "trash-to-steam" facilities. Municipal refuse incinerators must include means for minimizing the emission of environmentally harmful substances, such as HCl, $SO_2$, $NO_x$, polynuclear aromatic compounds, and dioxin. In addition, ash is a major product of municipal trash incinerators which itself must be disposed of in an environmentally acceptable manner. Two types of residue are produced by incineration: low density fly ash which must be removed by filtration, electrostatic precipitation, or a similar technique from the stack exhaust, and bottom "ash," a residue which is too dense to be carried with the hot exhaust gases.

Incineration may concentrate toxic materials present at low levels in the raw refuse so that the ash produced contains environmentally unacceptable proportions of pollutants such as mercury and cadmium. If untreated incinerator ash is disposed of in a landfill, such toxic material may leach out and seriously contaminate groundwater in the vicinity of the landfill. Clearly, there is a need for a process for treating incinerator ash to reduce the likelihood that toxic materials present in the ash, such as "heavy metals" including mercury and Cadmium, will leach out to contaminate local groundwater in the landfill area.

Many processes have been proposed for the incineration of municipal wastes and treatment of the residues formed thereby. For example, it has been suggested that fly ash produced by incinerating municipal waste be treated with a slightly acid medium to remove soluble materials, that the soluble contaminants removed thereby be treated chemically to precipitate them, and that the precipitate be immobilized as a compact material. H. Vogg, *Inter. Chem. Eng.*, vol. 27, no. 2 (April 1987) pp. 177–182. At the same time it has been advised that the incinerator itself be operated to produce an inert slag which can be reused. Id.

Hot bottom "ash" from a municipal refuse incinerator may be first treated by quenching with water in a quench tank. See, e.g., K. R. Lauer et al., "Profitable Utilization of Incinerator Residue From Municipal Waste" *Proc. Fifth Mineral Waste Utilization Symp.* (E. Aleshin, ed. Chicago 1976) pp. 215–218. The wet quenched bottom ash can be dried, screened to remove bulk metal, and separated into magnetic and non-magnetic fractions using a magnetic separator. The fly ash can be disposed of separately, such as by use as a supplement for cement, or it can be combined with the residue in the quench tank. Id. The non-magnetic fraction can be used as an aggregate for subbases or base courses (such as for highway construction or the like), as an aggregate for Portland cement concrete and articles formed therefrom such as concrete masonry blocks, or as an aggregate for bituminous concrete. The non-magnetic fraction includes glass, sand, slag, ash and some magnetic materials. The use of this fraction as an aggregate in Portland cement concrete is complicated by a potential alkali-glass reaction which can cause concrete expansion detrimental to the concrete. Id.

The non-magnetic fraction can be further processed. For example, the glass fraction can be separated and used to produce structural materials such as bricks. The waste glass can be ground, mixed with clay and sodium silicate, pelletized and sintered to give expanded glass aggregate pellets useful as aggregate for Portland cement concrete. K. J. Liles, "Lightweight Structural Concrete Aggregate From Municipal Waste Materials," *Proc. Fifth Mineral Waste Utilization Symp.* (E. Aleshin, ed. Chicago 1976) pp. 219–222.

Fine particulate waste can be agglomerated by adding water or a binder liquid to the dry waste powder in a disk or barrel pelletizer, the resulting green pellets being subsequently fired in a rotary kiln or traveling grate sintering machine to produce aggregate for concrete. E. Aleshin et al., "Aggregates Manufactured From Waste Materials," *Living With Marginal Aggregates* (ASTM Special Tech. Pub. 597, C. H. Best, ed. ASTM Philadelphia 1975) pp. 85–96. The rotary kiln can produce a lightweight expanded aggregate having a fused surface, having low water absorption and suitable for cast-in-place concrete. The traveling grate sintering machine produces a more porous aggregate which can be used in concrete blocks. Many types of mineral wastes, such as flyash from coal-burning power plants, talconite tailings, phosphate waste, and the like can be used in this manner. Id.

U.S. Pat. No. 3,383,228 discloses a process and apparatus for subjecting waste, such as municipal waste, to destructive distillation and for subsequent compaction of ash produced. A binder can be used to produce cohesive blocks of ash.

Pulverized municipal refuse can be used to fire a cement kiln, the resulting ash being incorporated into the cement clinker, according to U.S. Pat. No. 4,022,630.

U.S. Pat. No. 3,734,988 relates to a process for converting municipal refuse into useful building products such as blocks, bricks and wall-board. The average size of the waste is reduced by shredding, and the shredded waste is decomposed in the presence of nitrogen, water and air. The decomposed product is dried to render it biologically inert and ground to a fine powder. The fine powder is mixed with a binder such as a hydraulic setting cement and molded into a useful shape and cured until a specified strength is achieved. The cured, molded products can be coated to provide desired architectural characteristics.

U.S. Pat. No. 4,744,829 discloses a method of producing agglomerates which are resistant to leaching out from finely divided waste materials. A hydraulic agent such as lime or Portland cement is dissolved in water under forced mixing conditions until a colloidal solution is obtained. The finely divided waste is mixed with the colloidal solution and agglomerated, as with a pelletizer, and cured. When calcium hydroxide is used as the binder, cure can be accelerated by application of $CO_2$.

U.S. Pat. No. 4,629,509 discloses that cadmium and lead, which are toxic metals having relatively high volatility, tend to accumulate in fly ash resulting from burning municipal refuse. While the toxicity of the fly ash can be reduced somewhat by mixing it with bottom ash, the resulting mixture can exhibit toxic metal levels above standards set by the U.S. Environmental Protection Agency. If the mixture is used as a landfill material, the toxic metals can leach out to contaminate groundwater. However, the lead and cadmium in the residue obtained from refuse incineration can be immobilized by mixing the residue with either calcium sulfide or a mixture of dry lime and an inorganic sulfide.

U.S. Pat. No. 4,226,631 discloses a method of solidifying toxic wastes, such as harbor dredging sludges and sludges discharged from chemical industry, by use of a mixture of a lipid, such as a fatty oil or higher fatty acid, and a hydraulic cement or cement-type solidifying agent. The use of the lipid substantially reduces the concentration of certain toxic leachates.

U.S. Pat. No. 4,209,335 discloses the use of a mixture of a sulfate and alkaline metal salt as an additive for a hydraulic cement binder used to solidify toxic wastes, such as scrubber sludges and "community waste" incinerated ash. Noting that some wastes contain substances, such as certain heavy metal element compounds, which inhibit hydraulic cement from hardening by hydration, the inventors provide for the addition of a third additive component, an alkaline earth metal oxide or hydroxide, such as calcium oxide, which can be supplied by added fly ash. Example 5 reports the effect of using the additive in admixtures of Portland cement and electrostatic precipitator dust (fly ash) discharged from a municipal incinerator and containing considerable amounts of heavy metal elements which are known to hamper hydraulic cement from hardening by hydration. The additive provides higher compressive strengths than were otherwise observed. Example 6 reports the extent to which toxic metals, including mercury, cadmium, lead, hexavalent chromium, and arsenic are leached from toxic wastes solidified with additive-containing Portland cement. Toxic metal leachate concentrations are reduced when the additive is used in Portland cement to solidify either fly ash or municipal refuse incinerator ash.

U.S. Pat. No. 3,980,558 relates to a process for disposing of semi-liquid wastes containing soluble toxic materials to substantially prevent leaching of these toxic materials. A hydraulic cement such as Portland cement is admixed with the waste to provide a fluid mass which will set up to a rock-like consistency. An inert granular filler or aggregate for the cement, such as clay, bentonite, kaolin or the like can also be added.

U.S. Pat. No. 4,669,397 relates to a process for recovering useful materials from refuse fuel ash. Bottom ash from a refuse incinerator is fed to a magnetic separator to separate the major part of ferrous materials contained therein and subsequently separated into oversize, midsize, and undersize fractions. The undersize fraction is milled and subjected to another magnetic separation step, with the nonmagnetic fraction being separated into undersize and oversize materials. The oversize from this step are conveyed to a nonferrous metal collection operation, while the undersize from both the initial and the second separation steps are collected as aggregate. This aggregate can be used to dilute fly ash to reduce the concentration of toxic materials contained therein so that the so diluted flyash can be disposed of in a conventional landfill.

Portland cement has been used to trap a wide variety of toxic wastes in a solid matrix; including arsenic (U.S. Pat. Nos. 4,329,179; 4,142,912; 4,046,674; 3,933,624; 3,804,750), radwaste (U.S. Pat. Nos. 3,988,258; 4,122,028; 4,017,417; 4,504,317; 4,530,723; 4,533,395), fossil fuel ash (U.S. Pat. No. 4,726,710) acidic liquors containing heavy metals, such as from electroplating and metal finishing (U.S. Pat. No. 4,741,776), washing water filter sludge (U.S. Pat. No. 4,304,674), and oxysludge from steel manufacture (U.S. Pat. No. 4,601,832).

U.S. Pat. No. 4,331,088 discloses the use of a vertical shaft furnace to slag-encapsulate hazardous chemical wastes.

U.S. Pat. No. 4,615,809 relates to a method of stabilizing organic sludges with Portland cement, fly ash, gypsum and lime, the Portland cement being added last to enhance its function as a binder.

U.S. Pat. No. 4,116,705 relates to a method of encapsulating hazardous waste in a crystalline matrix binder formed by a slurry of Portland cement and aluminum silicate or aluminosilicate (e.g., vermiculite or fly ash).

U.S. Pat. No. 4,350,620 relates to a process for filtering radioactive particles from a fluid medium employing a filter aid comprising fibrids formed from polyethylene and/or polypropylene. The filter cake can be extruded using conventional plastics processing equipment to give plastic spheres in which radioactive particles are encapsulated.

U.S. Pat. No. 4,800,024 discloses a method of treating water containing heavy metals or radioactive metal using a water-insoluble carboxylated cellulose-transition metal oxide mixture to precipitate the target metal(s). The resulting precipitate can then be dried and calcined to give a non-leaching, ceramic-type spinel, or admixed with a suitable leach-resistant matrix material, such as asphalt or grout.

U.S. Pat. No. 4,623,459 relates to the use of aqueous asphaltic emulsions to tie up liquid and semi-liquid wastes in a hydrophobic, leach-resistant mass.

U.S. Pat. No. 4,741,834 discloses the use of Type C fly ash (from subbituminous or lignite coals) as a rectifying agent in land reclamation operations.

Despite the progress which has been made toward addressing the problems posed by the disposal of solid wastes from municipal, commercial and industrial sources, there remains a substantial need for an inexpensive, reliable method for treating incinerated waste, which often contains significant amounts of toxic materials, such as heavy metals, so that such incinerated waste can be disposed of in an environmentally sound manner.

While the incineration of waste materials is becoming an increasing popular response to the disposal problem, there has already been a substantial capital investment in incineration facilities by municipal authorities and by industry. Thus, there is a need for an incinerated waste treatment process and for apparatus for carrying out this process which build on this past capital investment and which can also be used in future incineration facilities.

In addition, there is a need for an on-site treatment process and on-site treatment apparatus which can be used to treat incineration residue as it is discharged from the incinerator, so that the costs and hazards associated with the shipping and storage of untreated residue are minimized or eliminated. Further, there is a need for a treatment process and apparatus which can be used in either a batch or continuous mode to treat incinerator residues. Similarly, there is a need for a process which can treat incinerator residues to provide a useful construction material, the size and strength of which can be controlled in the production process.

SUMMARY OF THE INVENTION

The present invention provides an advantageously simple and inexpensive process for treating residues produced by the incineration of commercial, industrial or municipal waste and apparatus for carrying out that process. The process of the present invention can be carried out onsite at the point of generation or storage of the residues. The process can be carried out continuously as residue is discharged from an incinerator, or batch-wise to treat accumulated residues. The process comprises mixing the residue with a heavy metals treatment agent to produce a mixture of untreated residue and heavy metals treatment agent; aggregating the mixture of heavy metals treatment agent and untreated residue into balls; and providing a cementitious coating on the balls. Preferably, the process additionally comprises mixing an aggregation agent with the mixture of heavy metals treatment agent and untreated residue. The cementitious coating can be provided by rolling green balls of the mixture of heavy metals treatment agent and untreated residue with a cementitious coating material and curing the coating material.

An important objective of the process of the present invention is the encapsulation of incinerator residue agglomerates in cementitious shells. Another objective is the treatment of incinerator residues to inhibit the leaching of metals, including heavy metals, into the environment. In addition, it is an objective that the encapsulated incinerator ash be provided with good structural integrity when the ash residue is to be recycled. The process provides a means of controlling leaching rates over long periods and means for tailoring the treatment to the analyzed composition of the incinerator residue.

In a presently preferred embodiment the process is adapted for treating hot, wet bottom residue or "ash" delivered from an incinerator quenching tank. The heavy metals treatment agent is preferably diatomaceous clay, which is preferably added in a weight ratio of about 0.01 to 0.02 based on residue solids. The aggregation agent is preferably Portland cement, and the balls are preferably coated with Portland cement. Type II Portland cement is preferred. The proportion of Portland cement aggregation agent to residue solids is selected to provide green balls of an aggregated mixture having a moist surface. The proportion of Portland cement aggregation agent can be based on the moisture content of the quenched residue. The green balls are preferably rolled with Portland cement as necessary to provide a coating about 0.05 cm thick on the green balls.

As the Portland cement aggregation agent contacts the mixture of incinerator residue and treatment agent, the aggregation agent is believed to coat the moist outer surface of the mixture, soaking up free surface water and causing the mixture to separate into individual pieces.

Preferably, the apparatus used to carry out the process of the present invention comprises means for mixing the incinerator residue with the heavy metals treatment agent; means for aggregating the mixture of heavy metals treatment agent and untreated residue into balls; and means for providing a cementitious coating on the balls to provide coated balls. The means for aggregating the incinerator residue into balls preferably includes a rotatable inclined drum having an upper end and a lower end and means for feeding the residue into the upper end of the inclined drum. In addition, the apparatus preferably includes means for mixing the aggregation agent with the mixture of untreated residue and aggregation agent. The rotatable drum is preferably divided into at least three zones; the means for mixing the residue with the heavy metals treatment agent being provided in a first zone; the means for aggregating the mixture of heavy metals treatment agent and untreated residue into balls being provided in a second zone; and the means for providing the cementitious coating on the balls being provided in a third zone.

In this apparatus, untreated incinerator residue and heavy metals treatment agent entering the rotating drum immediately begin to tumble and roll. In the first zone of the drum, they are thoroughly mixed together. As the mixture rolls, it is believed to become more dense as free water inside the mixture comes to the surface. This free water is believed to carry with it soluble contaminants from the incinerator residue such as soluble heavy metal salts. The thorough mixture of untreated incinerator residue and treatment agent enters the second zone of the rotating drum where the aggregation agent is added. When Portland cement is used as the aggregation agent, the free water moistens the cement, favoring the formation of discrete spheres or balls of the mixture of untreated incinerator residue and treatment agent and forming a layer or shell around the balls. Additional cement can then be added in the third zone to increase the thickness of the cementious coating as desired. Alternatively, cement can be added only in the third zone. A different aggregation agent can then be used in the second zone, or the balls can be formed by the mechanical action of the rotating drum on the mixture of untreated incinerator ash, depending on the characteristics of the mixture.

The cementitious layer is believed to trap the soluble contaminants in the free water and react with them to insolubilize them. The contaminants are believed to precipitate at or near the inner surface of the cementitious shell. The cementitious coating on the balls immediately begins to cure to provide a lightweight aggregate.

The combination of diatomaceous clay used as the heavy metals treatment agent and Portland cement used as the aggregation agent provides a surprising and unexpected reduction in the leaching of heavy metals from the cured product balls. The result is not expected because diatomaceous clay is regarded in the art as a physical adsorbent and as not being especially chemically reactive. In addition, the diatomaceous clay and the Portland cement are believed to be largely physically separated in the product balls, with the clay distributed largely in the interior and the cement forming the exterior coating on the balls.

The coated balls can be sized and packaged in flexible containers formed from plastic membrane impervious to water and the cementitious coating is allowed to cure. Alternatively, the coated balls can be simply conveyed to a stockpile where the cementitious shell are permitted to cure. The flexible containers are preferably labeled with information relating to production of the contents. The plastic membrane preferably comprises polypropylene sheet reinforced with nylon mesh.

Once the cementitious coating is cured, the previously soluble contaminants are immobilized. Leaching of heavy metals can be measured in trace amounts, similar to levels found in natural soils.

The apparatus for carrying out the process of the present invention comprises means for mixing the incinerator residue with a heavy metals treatment agent; means for aggregating the treated residue into balls and means for providing a cementitious coating on the balls to provide coated balls. Optionally the apparatus can include means for classifying the coated balls by size. The means for aggregating the residue into balls can include a rotatable inclined drum having an upper end and a lower end, and means for feeding the residue into the upper end of the inclined drum.

The rotatable drum can be divided into at least three zones or sections, the means for mixing the heavy metal treatment agent being provided in a first zone; the means for aggregating the treated residue into balls being provided in a second zone; and the means for providing a cementitious coating on the balls being provided in a third zone. The apparatus can further comprise means for mixing an aggregation agent with the treated residue. In a presently preferred embodiment the apparatus further comprises conveyor means for delivering a cementitious material to a predetermined locus; means for dividing the cementitious material delivered to the predetermined locus into a first stream and a second stream; means for mixing the first stream with treated residue in the second zone; and means for mixing the second stream with treated residue balls in the second zone to coat the balls. In addition, in this embodiment the rotatable drum further comprises a fourth zone for classifying the coated balls by size.

BRIEF DESCRIPTION OF THE DRAWINGS

FIG. 7 is a plan view of a portable bagging plant for use in packaging product made by the process of the present invention.

FIG. 8 is a side elevational view of the bagging plant of FIG. 7.

DETAILED DESCRIPTION OF THE PREFERRED EMBODIMENTS

Figure 1:
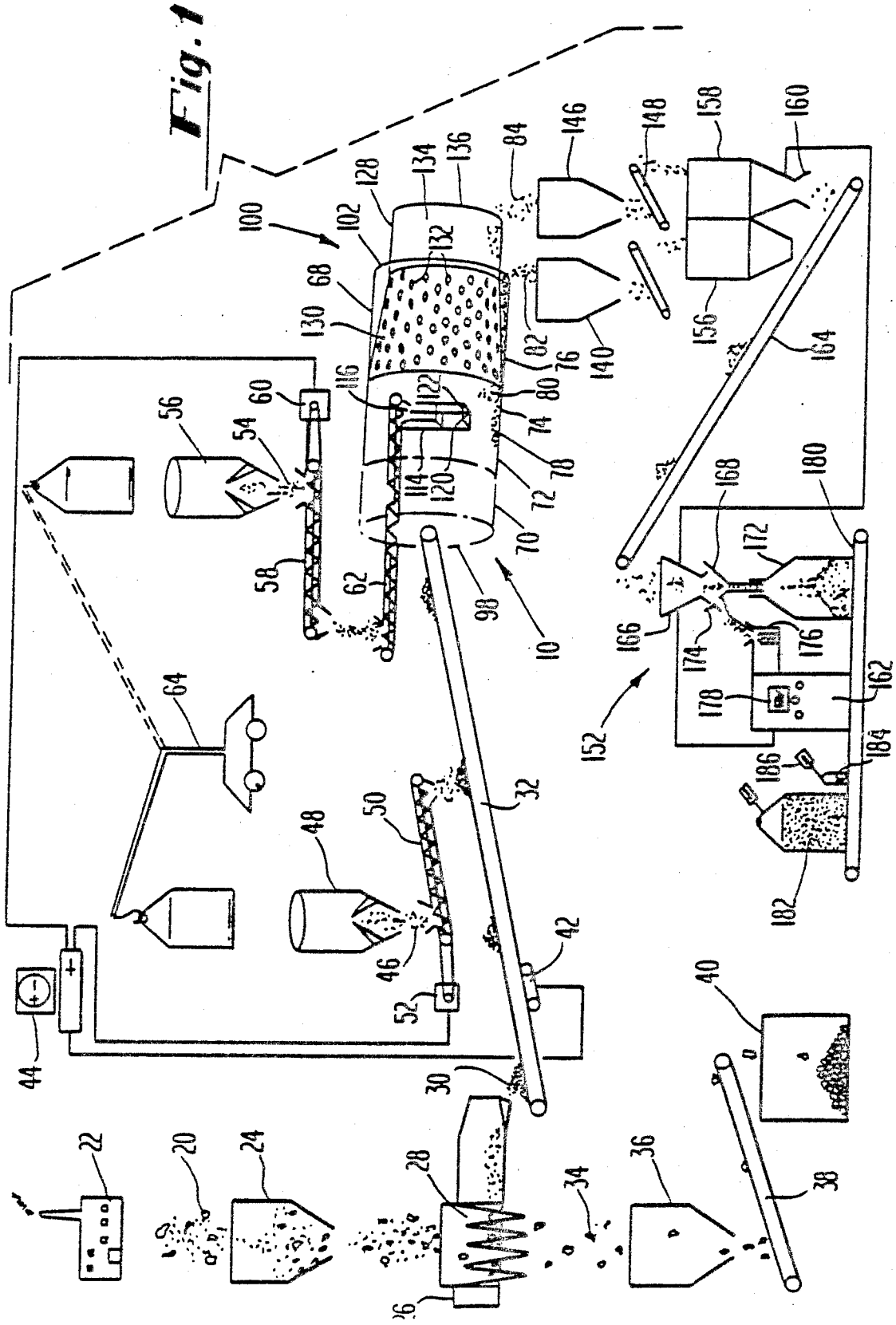
FIG. 1 is a semi-schematic perspective view, partially in section, of an embodiment of an apparatus for treating residues produced by the incineration of waste according to the process of the present invention.

Referring now to the drawings in detail, wherein like reference numerals indicate like elements in each of the several views, reference is first made to FIG. 1, wherein there is shown an incinerator residue treatment apparatus 100 for carrying out the process of the present invention in a semi-schematic perspective view, partially in section.

A raw untreated residue 20 is produced by incineration of waste materials in an incineration facility 22. The incinerated waste materials can be any type of commercial, industrial or municipal waste, including garbage or trash from residential, commercial or institutional sources. The composition of the residue 20 will vary depending on the source and composition of the waste material fed to the incineration facility, the nature and efficiency of the incineration facility, the extent to which the waste material is pretreated before incineration, and like factors.

The waste material may contain one or more toxic components (e.g. trace heavy metals such as mercury, lead, or cadmium) which are concentrated by the incineration process in the residue 20, or the incineration process itself may produce toxic materials (e.g. dioxins, hydrogen halides such as hydrogen chloride and hydrogen fluoride, nitrogen oxides, and sulfur dioxide). The raw untreated residue 20 of the incineration process can be referred to alternatively as raw untreated "ash," although its composition will reflect the composition of the waste material incinerated. When the waste material incinerated is municipal waste, the composition of the raw untreated "ash" 20 can include ash from the combustion of organic materials, glass, ferrous and nonferrous metals, unburned combustible materials, slag, ceramics, etc. See, e.g., F. N. Rubel, *Incineration of Solid Wastes*, (Noyes Data Corp. Park Ridge, NJ 1974) pp. 62–67, incorporated herein by reference.

The incineration facility 22 can be a municipal "trash-to-steam" facility in which municipal waste is incinerated and power in the form of steam or electricity is cogenerated. Alternatively, the incineration facility 22 can be specially adapted to the incineration of specific waste streams, such as those generated by chemical manufacturing processes, paper production, mineral processing, and the like. The raw untreated residue or ash 20 can be bottom or "heavy" ash, fly ash, or a mixture of bottom ash and fly ash. As supplied to the process of the present invention, the raw untreated residue 20 can include a substantial proportion of moisture. For example, the raw untreated residue 20 can be obtained directly from an incinerator quench tank (not shown) in which hot bottom ash from the incinerator's incineration chamber is deposited.

Some incinerators are constructed so that a water-filled quench tank serves as an emission-limiting liquid seal between the incineration chamber and the environment. Quenched, raw untreated bottom ash will typically be withdrawn from the quench tank at a temperature elevated above ambient by a drag conveyor (not shown) or the like. The bottom ash can be subsequently mixed with fly ash obtained from electrostatic precipitators, filter bags, or like means for reducing the emission of fine particulates from the flue of the incineration facility 22. The raw untreated ash can be treated immediately after discharge from the quench tank or it can be stored temporarily onsite after discharge. The temperature and moisture content of stored ash can differ substantially from those of raw untreated ash immediately after discharge from the quench tank.

Figure 2:
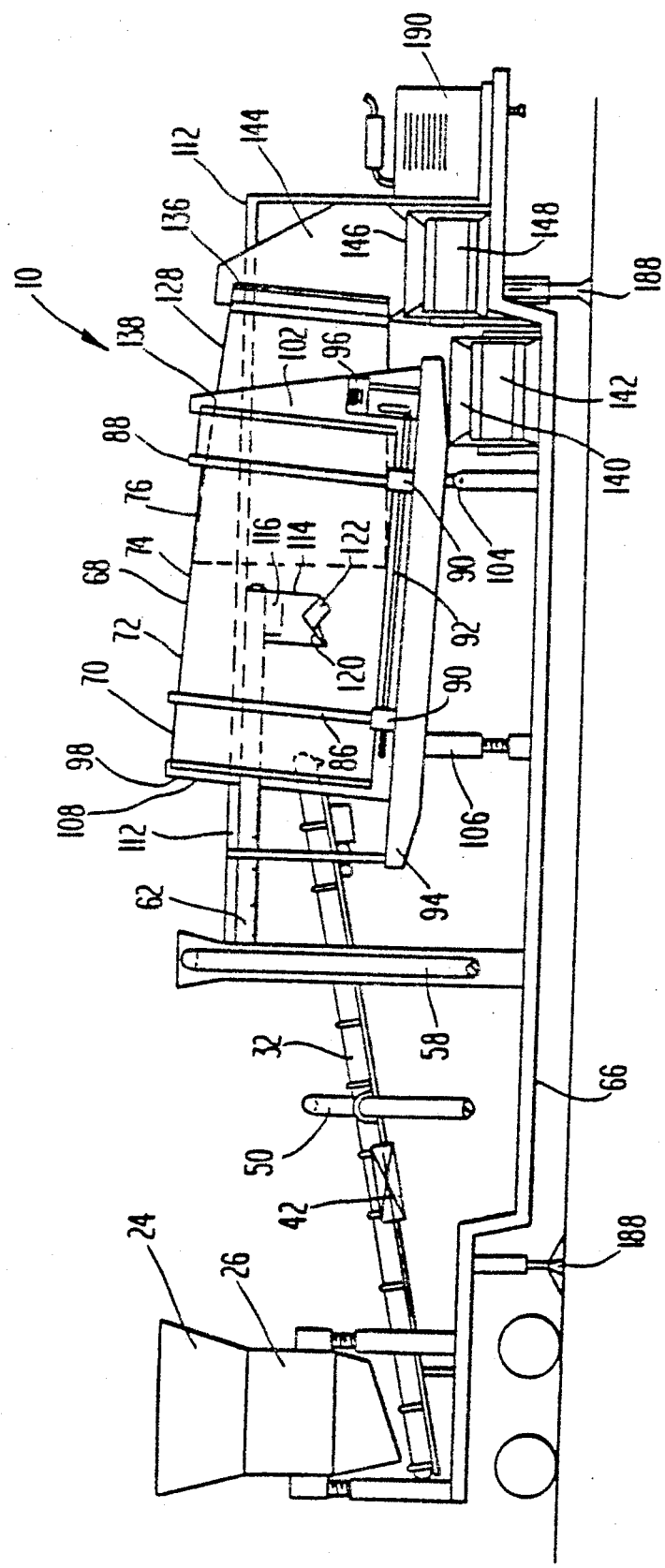
FIG. 2 is an exploded, fragmentary elevational view, partially in section, of a portion of the apparatus of FIG. 1.
Figure 3:
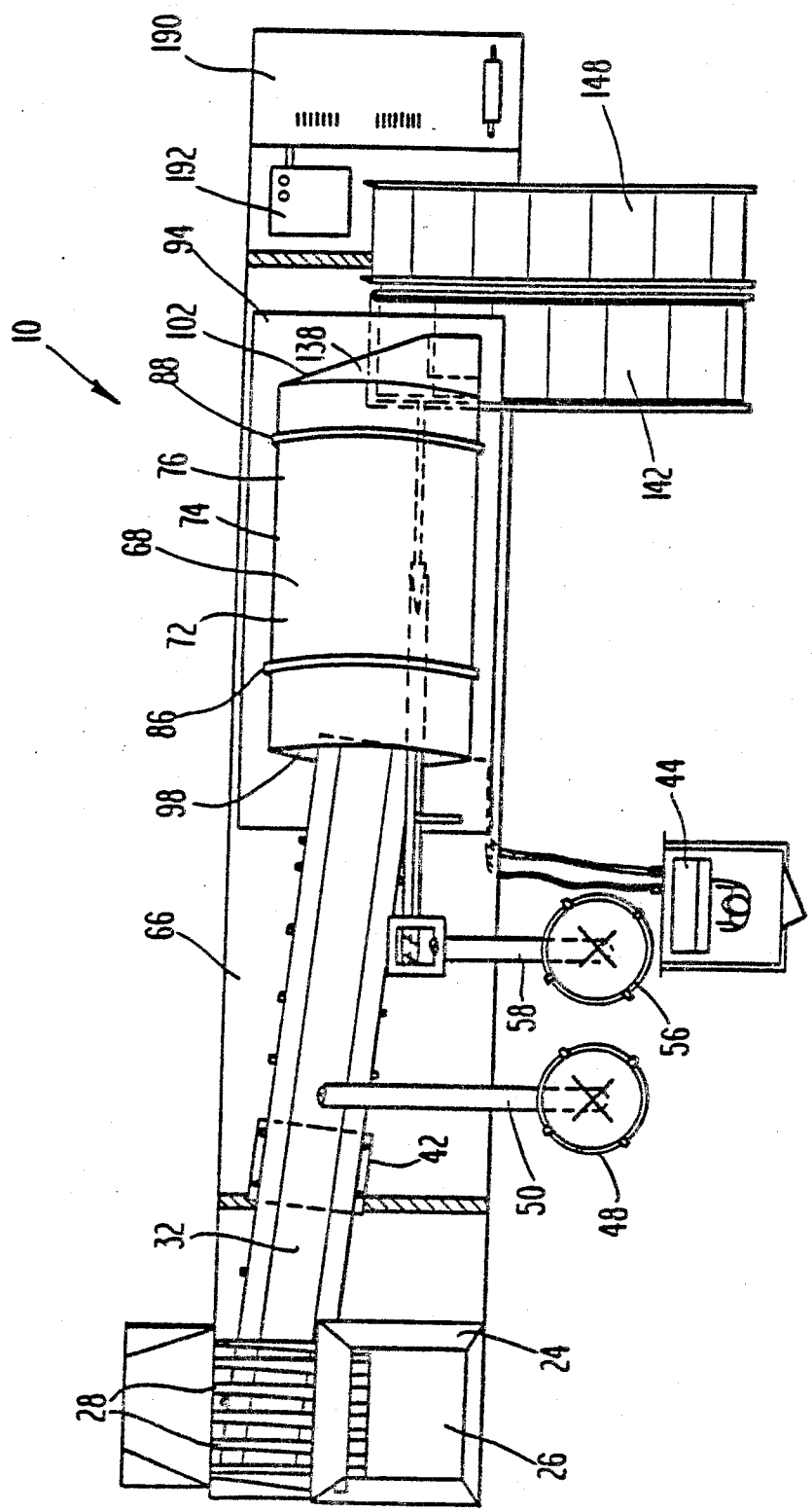
FIG. 3 is a top plan view of the apparatus of FIG. 2.

In the apparatus 100 of the illustrated embodiment (FIG. 1), the raw untreated residue 20 is delivered by suitable means (not shown) to a receiving hopper 24. As best seen in FIGS. 2 and 3, the receiving hopper 24 and associated downstream processing apparatus, which can collectively be referred to as the "ball-forming apparatus" 10 for reason which will become apparent from the discussion given below, is mounted on a first flatbed or "lowboy" truck trailer 66, so that the ball-forming apparatus 10 can be transported to a specific incinerator facility 22 or untreated residue storage site. Advantageously, the apparatus 100 can be quickly installed at a site without shutting down the incineration facility. The receiving hopper 24 is positioned directly above a vibratory scalper feeder 26 which conveys the untreated residue 20 over a series of grizzly bars 28 (FIGS. 1 and 3) spaced such that the gaps between them increase slightly from top to bottom to reduce clogging. The grizzly bars 28 are aligned generally parallel the flow of untreated residue 20 passing through the scalper feeder 26. An undersize fraction 30 of the untreated residue 20, for example, material smaller than about ten centimeters in any dimension, falls between the grizzly bars 28 and onto an untreated residue feed conveyor 32, which can be a "walking floor" type conveyor.

An oversize fraction 34 of the untreated residue 20, such as very large or bulky materials, for example, material larger than about 10 cm in any dimension, does not fall through the grizzly bars 28, but instead continues to travel to the bottom end of the scalper feeder 26 (best seen in FIG. 3). This oversize fraction 34 falls from the side of the scalper feeder 26 into an oversize residue receiving hopper 36, from which it is discharged onto an oversize residue stacking conveyor 38 which delivers the oversize untreated residue fraction 34 to a dumpster of truck 40 for subsequent removal and disposal. Most of the oversize fraction 34 obtained from incineration of municipal waste is bulky ferrous and non-ferrous metal which can easily be recycled.

The undersize fraction 30 travels up the untreated residue feed conveyor 32, passing over a weigh scale 42 which is positioned under the feed conveyor 32 at a point less than about halfway up the feed conveyor 32. The weigh scale 42 continuously monitors the weight of the fraction 30 passing over the weigh scale 42 and subsequently entering the downstream treatment apparatus. The monitored weight is reported to a control center 44, which can include a central process computer for controlling the treatment process. In addition to the weigh scale 42, means for monitoring other physical characteristics of the untreated residue 20 and/or the undersize fraction 30 of the untreated residue 20, such as the temperature and the moisture content, can also be provided (not shown) and the monitored physical characteristics can be reported to the control center 44.

The control center 44 employs the reported characteristics of the untreated residue 20 being fed into the downstream treatment apparatus as independent variables, and calculates values for dependent process variables such as motor speeds for motors powering conveyors feeding streams of solid treatment materials, valves delivering streams of liquid treatment materials, devices such as step motors controlling treatment process dwell times, etc. In calculating values for the dependent process variables, the control center 44 uses an algorithm which can be based on functional relationships derived from the physical and chemical characteristics of previously taken samples of untreated residue 20 and treated samples. These characteristics can be examined by laboratory determinations of percentage moisture, pH, particle size and particle size distribution, and chemical composition, including the presence, amount, and chemical state (e.g. free metal or soluble or insoluble salt or complex) of heavy metals such as lead, mercury, cadmium, and arsenic, et al.

For example, in a presently preferred embodiment of the process of the present invention, the undersize fraction 30 of the untreated residue 20 preferably has a moisture content of at least about eighteen percent by weight. The moisture content of the undersize fraction 30 can be continuously monitored by suitable means (not shown) and the monitored moisture content reported to the control center 44. The control center 44 compares the monitored moisture content with the predetermined minimum moisture content, and, in the monitored actual moisture content fall below the predetermined minimum, the control center activates a water delivery means (not shown) at an intensity and for a duration calculated to be sufficient to increase the moisture content of the undersize fraction 30 to the predetermined minimum moisture content. The water delivery means can be positioned, for example, immediately above the untreated residue feed conveyor 32 downstream of the weigh scale 42, and can be adapted to provide a fine water spray regulated, for example, by a valve actuated by a valve actuator controlled by the central computer of the control center 44.

Often the moisture content of the undersize fraction 30 will be excessive, as when the untreated residue 20 is delivered directly from an incinerator quench tank. In this case, excess water can be permitted to drain from the undersize fraction 30 by using an untreated residue feed conveyor 32 of a suitable type, such as a "walking floor" or reciprocating floor conveyor.

The untreated residue feed conveyor 32 can itself be powered by a variable speed motor (not shown) controlled by the central computer of the control center 44.

In the presently preferred embodiment of the process of the present invention, a heavy metals treatment agent is mixed with the undersize fraction 30 of the untreated residue 20. The heavy metals treatment agent can be a clay, and is preferably a high surface area, high silica, low moisture content type of clay, such as diatomaceous clay. Other examples of clays which can be used include montmorillonite (bentonite), attapulgite, kaolinite, illite, sepiolite, mixtures thereof, and the like. The heavy metals treatment agent is preferably added to the untreated residue in a weight ratio of from about 0.01 to 0.02 based on the solids of the untreated residue. It is an advantage of the process of the present invention that a relatively non-chemically reactive silicate like diatomaceous clay can be used, as opposed to prior art methods which employ a combination of a chemically reactive silicate and cement.

One or more additional other heavy metal treatment agents can also be added to the untreated residue, if desired.

However, surprisingly, it has been found that diatomaceous clay, which is believed to be relatively unreactive chemically, is unexpectedly effective as a heavy metals treatment agent when the preferred aggregation agent, Portland cement, is used in the process of the present invention. An unexpected reduction in the leaching of heavy metals from the product of the process of this invention is observed when the preferred heavy metal treatment agent is used in combination with the preferred aggregation agent.

Heavy metal treatment agents which tend to react with heavy metals or soluble salts of such heavy metals to form water insoluble salts, compounds or compositions can also be added. For example, an additive containing at least one sulfate, such as alum, at least one alkaline metal carbonate, bicarbonate, or silicate, such as calcium carbonate, and at least one akaline earth metal hydroxide, such as calcium hydroxide, can be added to the untreated residue, such as disclosed in U.S. Pat. No. 4,209,335. Alternatively, a heavy metal treatment agent such as an equimolar mixture of dry lime and an aqueous solution of an alkali metal sulfide, such as disclosed in U.S. Pat. No. 4,629,509 for the immobilization of lead and cadmium in fly ash, can be employed. Similarly, an additive such as a water soluble salt of manganese or an alkaline earth metal reactive, such as disclosed to be useful in U.S. Pat. No. 4,142,912 for the immobilization of arsenic wastes, can be used. A series of heavy metal treatment agents can also be used. For example, as disclosed in U.S. Pat. No. 4,601,832, the untreated residue can be first acidified with an acid solution of a metal of Group VIIa or VIII, such as iron or manganese, and alkali can be subsequently added to entrap the heavy metal in the precipitating hydroxide. Other heavy metal treatment agents which can be used are those believed to provide a hydrophobic environment for the heavy metal ions, such as the lipids employed for this purpose disclosed in U.S. Pat. No. 4,226,631.

As shown in FIG. 1, in the presently illustrated embodiment of the apparatus of the present invention, the heavy metals treatment agent 46 is stored in a feed hopper 48, from which it is fed onto a first screw conveyor 50 powered by a first variable speed motor 52. The first screw conveyor 50 transports the heavy metals treatment agent 46 from the feed hopper 48 and delivers the heavy metals treatment agent 46 onto the walking floor of the untreated residue feed conveyor 32. The rate at which the heavy metals treatment agent 46 is discharged from the feed hopper 48 can be controlled in a conventional manner, as by use of an appropriate valve (not shown). The feed hopper valve can be actuated by a conventional valve actuator (not shown). The extent to which the feed hopper valve is open and the speed of the first variable speed motor 52 are monitored and controlled by the control center 44 to deliver heavy metals treatment agent 46 to the belt of the untreated residue feed conveyor 32 at a rate calculated to provide a predetermined weight ratio of heavy metals treatment ratio to untreated residue 20. The heavy metals treatment agent 46 can be delivered batchwise or continuously to the untreated residue feed conveyor 32. The weight ratio of heavy metals treatment agent 46 to untreated residue 20 can be based on prior laboratory determinations of chemical and/or physical characteristics of the untreated residue 20, such as the percentage moisture, temperature, pH, particle size distribution, surface area, and the type and percentage of contaminants, including heavy metals such as lead, cadmium, mercury and the like.

In addition, or alternatively, one or more of the physical and chemical properties of the untreated residue 20 can be monitored periodically or continuously at some point upstream of the point at which heavy metals treatment agent 46 is delivered to the untreated residue conveyor 32. For example, the temperature and the percentage moisture of the untreated residue 20 can be continuously monitored by conventional sensors proximate the weigh scale 42 (not shown). This information can be transmitted to the control center 44 and used, along with the information about the quantity of untreated residue 20 delivered to the untreated residue feed conveyor 32 provided by the weigh scale 42, to determine a target heavy metals treatment agent 44 to untreated residue 20 weight ratio and to control the speed of the first variable speed motor 52 and the valve actuator of the treatment agent feed hopper 48 to provide this target weight ratio.

When more than a single heavy metals treatment agent is used, two or more heavy metals treatment agents can be premixed to form a generally homogeneous mixture before delivery to the treatment agent feed hopper 48. Alternatively, and when the two or more heavy metals treatment agents will not form a physically generally homogeneous mixture, as when both a hydrophobic solid and a hydrophilic liquid are employed, separate storage, control and delivery means can be provided.

In the presently preferred embodiment of the process of the present invention, an aggregation agent, preferably Type II Portland cement, is mixed with the untreated residue and the heavy metals treatment agent to provide a treated residue. The aggregation agent is preferably a generally dry material with an affinity for water. A mixture of the untreated residue and the heavy metals treatment agent will generally have a significant moisture content, and will consequently tend to form a continuous phase. The mixture of water and untreated residue 30 is often thixatropic, as when the untreated residue includes a substantial proportion of fines. In addition, a mixture of untreated residue and heavy metals treatment agent can also be thixatropic, as when the untreated residue contains fly ash and diatomaceous clay is used as the heavy metals treatment agent.

The addition of the aggregation agent is believed to aid in breaking the liquid surface tension which may otherwise tend to maintain the continuity of the mixture, and to favor the formation of a discontinuous phase by collecting at the air-mixture interface. Preferably, the composition of the mixture is adjusted if necessary to favor the formation of a discontinuous phase when shear forces are applied to the mixture. As discussed below, the present process includes the formation of a discontinuous phase comprising balls formed from the untreated residue/ heavy metals treatment agent and the added aggregation agent.

In addition to favoring this change in the physical state of the mixture of the untreated residue and the heavy metals treatment agent, the aggregation agent is preferably selected to be reactive with one or more of the heavy metals and/or other toxic contaminants in the untreated residue and to thereby provide an additional means of immobilizing such toxic contaminants. For example, when Portland cement is used, it is believed that water soluble salts of heavy metals tend to diffuse from the untreated residue to the constituent particles of the Portland cement where the heavy metal ions react and tend to form water-insoluble precipitates with certain constituent chemical species of the Portland cement.

While Type II Portland cement is preferred, other types of hydraulic cements can also be used as an aggregation agent and/or to coat balls formed from the mixture of heavy metals treatment agent and untreated incinerator residue. For example, pozzolanic cements, lime cements, grappier cements, and other types of Portland cement could also be used. When a hydraulic cement is used, the moisture present in the mixture of the untreated residue and the heavy metals treatment agent will tend to cause the hydraulic cement to cure to form a solid, continuous binder for the untreated residue/heavy metals treatment agent mixture having high compressive strength. If desired, the moisture content of the untreated residue or of the untreated residue/heavy metals treatment agent mixture can be adjusted to enhance the compressive strength of the cured binder formed by the hydraulic cement. For example, the moisture content can be increased by addition of water. However, the addition of water is likely to increase the weight of aggregation agent required to achieve conditions favoring formation of a discontinuous phase. Preferably, the proportion of aggregation agent added is selected to both provide conditions favoring formation of a discontinuous phase and to aid in immobilizing toxic contaminants of the untreated residue. When the untreated residue is bottom ash from a municipal incinerator, and the heavy metals treatment agent is diatomaceous clay added at a weight ratio of about 0.01 to 0.02 based on untreated residue solids, and the aggregation agent is Type II Portland cement.

The weight ratio of aggregation agent to untreated residue solids depends to some extent on the identity of the heavy metal ion or ions which it is desired to immobilize. For lead this ratio is preferably from about 0.07 to 0.14. While greater proportions of aggregation agent can be used, such as 0.21, a proportionate decrease in the leaching of the heavy metal ion is not observed.

When a hydraulic cement is used as an aggregation agent, the type of hydraulic cement used and the ratio of hydraulic cement to untreated residue/heavy metals treatment agent mixture are preferably selected to control expansion of the balls formed during cure of the hydraulic cement aggregation agent. Depending on the composition of the untreated residue/heavy metals treatment agent mixture, the hydraulic cement may tend to expand as it cures. For example, when the untreated residue contains sulfate, as in the form of calcium sulfate dihydrate (gypsum), a hydraulic cement which contains tricalcium aluminate, such as Portland cement (approximately 10% w/w tricalcium aluminate), will tend to expand on cure because the mineral etteringite is formed by reaction between sulfate and tricalcium aluminate. Untreated residues containing sulfate are encountered when scrubber sludge from facilities having acid gas scrubber systems is included in the untreated residue. As discussed below, in the process of the present invention a cementitious coating is provided on the green balls formed from the mixture of untreated residue, heavy metals treatment agent, and aggregation agent. Preferably, about 10 percent by weight of the total amount of cement is used as aggregation agent. When Portland cement is used to provide the cementitious coating, the cured cementitious coating will tend to have high compressive strength, but low tensile strength, and will tend to be susceptible to cracking if the interior of the balls expand after the Portland cement coating has become substantially cured. Thus, when the untreated residue contains sulfate, it may be desirable to use a tricalcium aluminate-free material, such as an aluminous cement as disclosed in U.S. Pat. No. 4,329,179, as an aggregation agent.

In the presently preferred embodiment of the process of the present invention Type II Portland cement is used both as the aggregation agent and to provide a cementitious coating on the green balls formed from the mixture of untreated residue, heavy metals treatment agent and aggregation agent. As shown in FIG. 1, in one of the possible embodiments of the apparatus of the present invention 10, Portland cement 54 is stored in a feed hopper 56 adapted to deliver the Portland cement 54 to a second screw conveyor 58 powered by a second variable speed motor 60. The delivery of Portland cement 54 from the Portland cement feed hopper 56 can be controlled by a conventional valve actuated by a valve actuator (not shown). The extent to which the Portland cement feed hopper valve is open and the speed of the second variable speed motor 60 are monitored and controlled by the control center 44. As best seen in FIG. 3, the second screw conveyor 58 delivers Portland cement 54 to a third screw conveyor 62, which subsequently conveys the Portland cement 54 generally parallel the untreated residue feed conveyor 32 for delivery to means for dividing the Portland cement into an aggregation agent stream and a cementitious coating stream. When different materials are used as the aggregation agent and for forming the cementitious coating, separate means for storing and delivering the materials can be employed.

As shown in FIG. 1, heavy metals treatment agent 46 and Portland cement 54 are delivered to their respective feed hoppers 48, 56 by a mobile boom crane 64 from bulk storage facilities for these materials.

The untreated residue 20 and the heavy metals treatment agent 46 are delivered by the untreated residue feed conveyor 32 to one end of a rotatable mixing drum 68. The rotatable mixing drum 68 in generally divided into four sections. In a first section 70 the untreated residue 20 is mixed with heavy metals treatment agent 46.

In a second section 72 the aggregation agent stream of the Portland cement is first mixed with the mixture of untreated residue and heavy metals treatment agent formed in the first section 70. This is believed to aid in breaking the surface tension of the moisture in the mixture and causing formation of discrete pellets or balls 78 of an uncured or "green" mixture of aggregation agent, untreated residue, and heavy metal treatment agent. When the mixture of untreated residue and heavy metals treatment agent is thixotropic, as when it comprises fly ash and diatomaceous clay, discrete pellets or balls will tend to be formed in the mixing drum 68 even in the absence of the aggregation agent. Under the shearing forces exerted on the mixture by the rotating drum, it is believed the viscosity of the mixture decreases and some phase separation takes place, with excess moisture tending to go to the surface of the discrete balls formed. The "aggregation" agent will then tend to coat the exterior surfaces of the balls. In particular, when Type II Portland cement is used as the aggregation agent, the cement is found to coat balls of the mixture of fly ash and diatomaceous clay. While a small proportion of the added aggregation agent may work its way into the interior of the balls, most of the added aggregation agent will adhere to the exterior surface of the ball, tending to form a coating thereover.

The mixing time and the size of the balls produced by the process are related. If the balls are rotated for too long in the drum, their average size may actually begin to decline, and a short mixing time is usually preferred.

The cementitious coating stream of the Portland cement is subsequently mixed with the green balls 78 in a third section 74 to provide coated balls 80 having an uncured cementitious coating. When the aggregation agent is Portland cement, this second addition of Portland cement tends to build up the thickness of the cementitious coating to the extent desired. In a fourth section 76 of the mixing drum 68, the coated balls 80 are separated into a first and a section size fraction 82, 84 before being discharged from the mixing drum 68. The use of cement as a coating on the balls including the incinerator residue results in a significantly more efficient us of cement than in prior art processes which use wastes as fillers or aggregates in bulk cement.

As best seen in FIG. 2, the mixing drum 68 has a pair of trunions 86, 88 on its exterior surface and is mounted for rotation on two pairs of trunion wheels 90. Each pair of trunion wheels 90 is fixedly mounted on an axle 92 (only one axle 92 and its respective trunion wheels 90 is visible in FIG. 2). The axles 92 are mounted on a large steel frame member 94 which thereby supports the weight of the mixing drum 68 and its contents. The axles 92 are driven by a pair of motors 96 (only one visible in FIG. 2). The motors 94 drive the trunion wheels 90 on the axles 92 which in turn cause the mixing drum 68 to rotate. The angular velocity of the mixing drum 68 can be adjusted by varying the rotational speed of the motors 96 or by providing variable ratio transmission means (not shown) between the motors 96 and the trunion wheel axles 92. The angular velocity of mixing drum 68 can be controlled by the control center 44 by sensing the angular velocity of the mixing drum 68 and/or the drum drive motors 96 and adjusting the angular velocity of drum drive motors 96 or the ratio of the variable ratio transmission means to achieve the mixing drum angular velocity desired.

The frame member 94 is mounted in the well of the lowboy trailer 66 so that the mixing drum 68 can be inclined at a variable angle from the horizontal. Gravity will thus drive passage of material fed into the mixing drum 68 from the upper end or mouth 98 of the mixing drum 68 to the lower or discharge end 102 of the mixing drum 68. The frame member 94 is mounted on a pivot 104 proximate the discharge end 102 of the mixing drum 68 and on an adjustable jack 106 proximate the mouth 98 of the mixing drum 68 so that the angle of inclination of the drum 68 can be varied by adjusting the jack 106. The jack 106 can be adjusted manually, or it can be controlled by a motor driven actuator (not shown) so that the angle of inclination of the mixing drum 68 can be controlled by the control center 44. Means can also be provided for remotely sensing the angle of inclination of the mixing drum 68 by the control center 44.

The mouth 98 of the mixing drum 68 is provided with a cover 108 for reducing particulate emissions from the mixing drum 68. The untreated residue feed conveyor 32 and the third screw conveyor protrude through the cover 108 and into the interior of the mixing drum 68. The cover 108 includes a flexible membrane proximate the top of the belt of the untreated residue feed conveyor 32 to enhance the effectiveness of the seal where the belt, laden with untreated residue 20 and heavy metals treatment material 46, passes through the cover 108.

Figure 4:
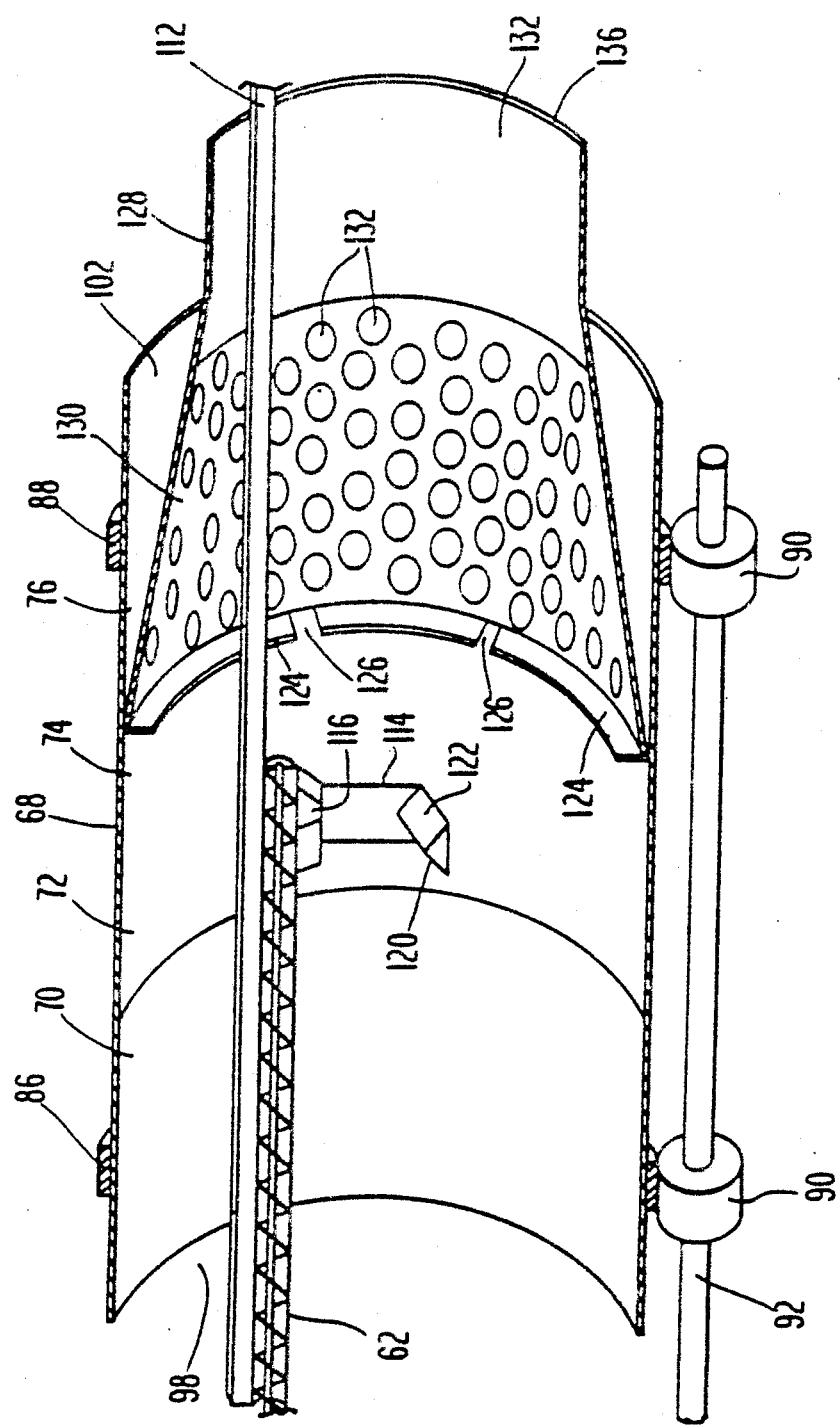
FIG. 4 is an exploded, fragmentary perspective sectional view of a portion of the apparatus of FIG. 1.

The untreated residue feed conveyor 32 discharges untreated residue 20 and heavy metals treatment material 46 into the first section 70 of the mixing drum 72 proximate the mouth 98 of the mixing drum 68. The first section 70 extends approximately twenty-five percent of the total length of the mixing drum 68. As best seen in FIG. 4, which provides an exploded, sectional view of mixing drum 68, the interior wall of the first section 70 of the mixing drum 68 is preferably generally smooth. Untreated residue 20 and heavy metals treatment agent 46 fall from the end of the untreated residue feed conveyor 32 onto the interior surface of the first section 70 of the rotating drum 68 and are thoroughly and intimately mixed together, thus providing a mixture of the heavy metals treatment agent 46 and the untreated residue 20. The thorough mixing and intimate physical contact are believed to enhance the effectiveness of the heavy metals treatment agent 46 in immobilizing or otherwise treating the toxic contaminants in the untreated residue 20. The mixture of the untreated residue 20 and the heavy metals treatment agent 46 generally includes a significant amount of moisture, at least enough so that the mixture tends to form a waterbound substantially continuous phase, in the absence of an applied shearing force. When the untreated residue 20 includes fly ash and the heavy metals treatment agent 46 is diatomaceous clay, the mixture is thixotropic.

Figure 5:
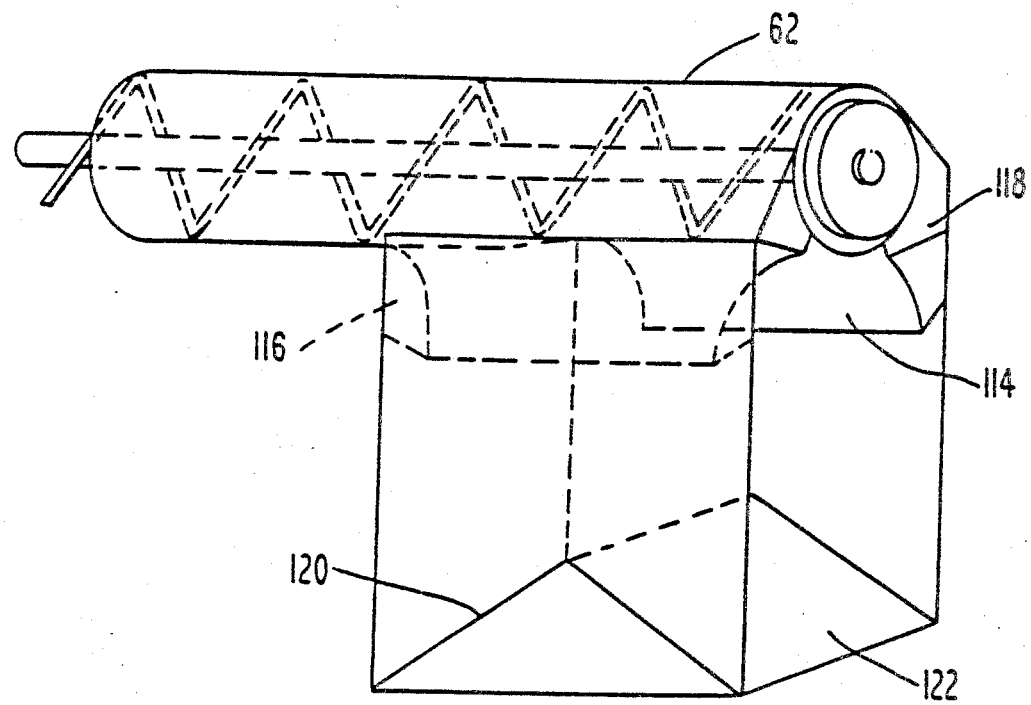
FIG. 5 is an exploded, fragmentary perspective view of a portion of the apparatus of FIG. 4.
Figure 6:
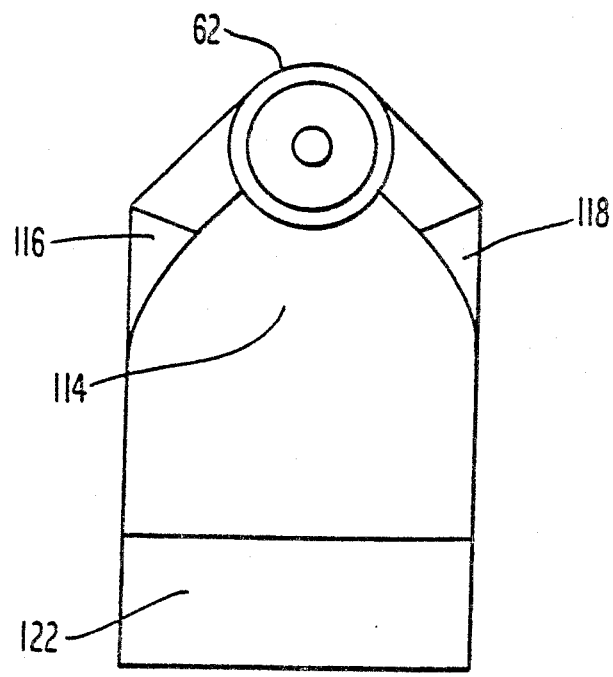
FIG. 6 is an end elevational view of the apparatus of FIG. 5.

The mixture of untreated residue 20 and heavy metals treatment agent 46 is driven by gravity from the first section 70 to the second or rolling section 72 of the rotating drum 68. The second section 72 extends approximately ten percent of the length of the mixing drum 68. The third screw conveyor 62 is mounted on and supported by a steel beam 112 which extends through the entire length of the mixing drum 68. The steel beam 112 is itself mounted on and supported by a pair of vertical beams 114 (one of which is visible in FIG. 2). Portland cement 54 is discharged from the third screw conveyor 62 through a discharge spout 114 (best seen in the exploded fragmentary views of FIGS. 5 and 6). The discharge spout 114 includes a pair of generally outwardly and downwardly extending chutes 116, 118 proximate the inward terminus of the third screw conveyor 62 for directing a pair of approximately equal streams of Portland cement 54 downwardly and laterally on either side of the third screw conveyor 62. These two streams of Portland cement impinge on a first and second deflector plate 120, 122 joined at a common edge and oriented to provide a first, backward-directed stream of Portland cement and a second, forward-directed stream of Portland cement. The first stream of Portland cement falling from the first deflector plate 120 is the aggregation agent stream. Portland cement in this stream is mixed with the mixture of untreated incinerator residue 20 and heavy metals treatment agent 46 in the second or rolling section 72 of the mixing drum 68.

If desired, the two deflector plates 120, 122 can be pivotably mounted for rotation about their common edge (not shown) and the angles of deflection can be varied to optimize the aggregation and/or coating processes, as by remotely controlled actuators for each deflector plate. Similarly, means can be provided for adjusting the relative amounts of Portland cement delivering in the first and second streams, as by providing means for altering the position of the deflector plates 120, 122 relative to the chutes 116, 118 (not shown).

As the aggregation stream of the Portland cement contacts the moist surface of the mixture of the untreated residue and heavy metals treatment agent, it is believed to tend to soak up free water and tends to break up the surface tension or meniscus of the aqueous "binder" which otherwise tends to hold the mixture of untreated residue and heavy metals treatment agent together as a substantially continuous phase. As the mixing drum 68 rotates, a shearing force is imposed on the mixture including the untreated incinerator residue, the heavy metals treatment agent, and the aggregation agent, causing the mixture to break up into discontinuous pieces or pellets, as the attractive force of the aqueous binder has been reduced by the addition of the aggregation agent. The rotation of mixing drum 68 then causes the individual pellet or pieces of the mixture to roll up into a generally spherical shape, providing balls 78 of a "green" or uncured mixture of treated residue and aggregation agent, like a snowball rolling downhill. The regularity of the shape of the green balls 78 depends on a number of factors, such as the particle size distribution of the untreated residue. Similarly, the average size and size distribution of the green balls 78 are believed to depend on a number of factors, such as the moisture content of the untreated residue, the ratio of heavy metals treatment agent to untreated residue, the ratio of aggregation agent to the mixture of heavy metals treatment agent and untreated incinerator residue, and the like. Preferably, these factors are controlled to provide green balls 78 having a predetermined average size, such as an average size suitable to meet local market demands for contruction aggregate.

As the green balls 78 roll within the mixing drum 68, they are believed to become more dense as free water within the green balls 78 is driven by the centrifugal forces generated by rolling toward the exterior surfaces of the green balls 78. The free water may carry with it dissolved toxic contaminants.

The dwell or retention time of the green balls 78 in the second section 72 of the mixing drug 68 can be increased by providing a plurality of baffles (not shown) on the interior surface of the second section 72, the baffles extending generally perpendicular to the rotational axis of the mixing drum 68 to retard passage of the green balls 78. Similarly, the dwell time of the green balls 78 in the second section 72 can be increased or reduced as desired by decreasing or increasing, respectively, the angle of inclination of the mixing drum 68 by operation of the jack 106.

The green balls 78 formed in the second section 72 roll down into the third or coating section 74 of the mixing drum 68. The third section 74 extends for approximately twenty percent of the length of the mixing drum 68.

The stream of Portland cement falling from the second, forward-directing deflector plate 122 is the cementitious coating-forming stream, and is directed to impinge on the green balls 78 in the third section 74 of the mixing drum 68. The Portland cement, or cementitious coating-forming agent, sticks to the moist exterior of the green balls 78 and forms an uncured cementitious coating or shell thereon and to thus provide coated balls 80. The thickness of the uncured concrete coating or shell depends on the moisture available at the surface of the green balls 78, and the rate at which Portland cement is delivered in the cementitious coating stream. Preferably, the rate at which Portland cement is delivered in the cementitious coating stream is adjusted so that substantially all the Portland cement delivered in this stream is consumed in forming the cementitious coating on the green balls 78, and little free, unreacted Portland cement is discharged from the mixing drum 68.

The dwell or retention time of the coated balls 80 in the third section 74 of the mixing drum 68 is increased by providing a plurality of baffles 124 on the interior surface of the mixing drug 68 between the third section 74 and a fourth section 76, the baffles 124 extending generally perpendicular to the rotational axis of the mixing drum 68, to retard passage of the coated balls 80, and having a plurality of gaps 126 therebetween to permit passage of the coated balls 80.

The thickness of the cementitious coating is preferably sufficient to provide coated balls 80 which have substantial leaching resistance when the aggregation agent in the interior of the coated balls 80 and the cementitious coating on the exterior of the coated balls 80 have cured. Preferably, the thickness of the coating is sufficient so that it will not fracture when the coated balls 80 are subsequently subjected to compressive forces, as when the coated balls 80 are ultimately disposed of in a landfill, or alternatively used as a construction aggregate. Significantly, it is preferred that the thickness of coating be sufficient so that toxic contaminants which would otherwise be leached from the interior of cured coated balls, as by the action of groundwater in a landfill, will tend to react with toxic contaminants dissolved in water diffusing through the cured cement coating or shell and form insoluble precipitates, thereby immobilizing the otherwise soluble toxic contaminants in the cementitious coating.

Preferably, the thickness of the cured coating is at least about 0.05 cm. Means can be provided to adjust the thickness of the uncured coating. For example, additional moisture can be added to the surface of the uncoated balls 78, as by providing a means for delivering a fine water spray intermediate the second section 72 and the third section 74 to impinge on the surface of the uncoated balls 78 (not shown). Similarly, a means for delivering a fine water spray in the third section 74 to moisten the surface of previously coated balls 80 followed by means for delivering an additional stream of cementitious coating agent to the moistened surface of the coated balls 80 and thus increase the total thickness of the coating can also be provided (not shown), as can multiple pairs of water spray delivery means and cementitious coating agent delivery means sufficient to increase the thickness of the coating to the extent desired (not shown).

After the green balls 78 have been coated in the third section 74 they roll through the gaps 126 in the baffles 124 and into the fourth or screening section 76 of the mixing drug 68. The fourth section 76 extends approximately forty-five percent of the length of the mixing drum 68. The fourth section 76 is provided with a generally conical plate member 128 which is attached to the interior surface of the mixing drum 68 proximate the baffles 124. The plate member 128 includes a first portion 130 having a plurality of generally circular apertures 132 of common dimension, and a second portion 134 having a continuous surface and an exterior edge 136, and extending from within the mixing drum 68, through the discharge end 102 of the mixing drum 68. The exterior edge 136 of the second section 134 is spaced from the discharge end 102 of the mixing drum 68.

The conical angle of the plate member 12 is selected so that coated balls 80 traveling through the gaps 126 between the baffles 124 are forced up a slight incline against gravity by rotation of the mixing drum 68 and force exerted by other coated balls 80 subsequently passing through the gaps 126. As the coated balls 80 travel up the first portion 130 of the plate member 128, those coated balls 82 smaller than the diameter of the generally circular apertures 132 fall through the apertures 132 and onto the interior surface of the mixing drum 68. Coated balls 84 larger than the diameter of the apertures 132 continue to travel up the slight incline and onto the second portion 134 of plate member 128. The smaller coated balls 82 thus form a first size fraction which falls from the discharge end 102 of the mixing drum 68 and the larger coated balls 84 thus form a second size fraction which falls from the exterior edge 136 of the plate member 128.

As best seen in FIGS. 2 and 3, the smaller coated balls 82 fall a short distance from the discharge end 102 onto a small product discharge chute 138 into a small product receiving hopper 140 and thence onto a small product conveyor 142. Similarly, the larger coated balls 84 drop a short distance from the exterior edge 136 of the plate member 128 onto a large product receiving chute 144 and thence into a large product receiving hopper 146 and onto a large product conveyor 148. The plate member 128, the large product discharge chute 144, and the large product receiving hopper 146 have been omitted frog FIG. 3 for clarity.

As shown in FIG. 1 the larger coated balls or large product 84 are gently conveyed by the large product conveyer 148 to a large product bin 150 in a bagging plant 152 mounted on a second lowboy trailer 154 (best seen in FIGS. 7 and 8). Similarly, the smaller coated balls or small product 82 is gently conveyed by the small product conveyor 142 to a small product bin 156 in the bagging plant 154. The two bins 150, 156 are side-by-side and share a common wall. Discharge from the small product hopper 156 and the large product hopper 150 is regulated by two pairs of feed gates 158, 160, one feed gate pair controlling discharge from either bin 156, 158. The feed gates 158, 160 are opened and closed by conventional hydraulic actuation means (not shown) and are controlled by a preprogrammed command center 162. Only one of the two pairs of gates 158, 160 can be open at any time.

As one of the bin gates 158, 160 opens either small product 82 or large product 84 falls onto a bagging plant belt conveyor 164 which feeds a product weighing hopper 166, which is also provided with a gate controlled by hydraulic actuation means (not shown). When the weight of the product in the product weighing hopper 166 reaches a predetermined level, the previously open gate (158 or 160) on the product bin (156 or 150) is closed by the command center 162 and the gate on the product weighing hopper 166 is opened. The weighed amount of product falls through a bag loading spout 168 having a trunk 170 and into a product bag 172 which has been manually or by automatic means (not shown) fitted over the trunk 170 of the bag loading spout 168.

An automatic sampler 174 randomly takes at least one sample of the product as it flows through a container 176 attached to a bag tagging machine 178 controlled by the command center 162. The product bag 172 is slowly filled while standing on a bag conveyor 180. When filling is complete, the bag 172 is sealed and conveyed past the tagging machine 178, where both the filled product bag 182 and its corresponding filled sample container 184 are labeled with duplicate tags 186 that have information which is relevant to monitoring the environmental responsibilities of the residue generator.

The curing product in the filled bag 182 is lifted off the bag conveyor 180 by the boom crane 64 or similar mobile equipment, and placed in a holding area (not shown) for a predetermined period to allow the hydraulic cement curing process, and the concurrent reaction of the moisture in the mixture of heavy metals treatment agent and untreated residue with the Portland cement, to continue inside the safe and controlled atmosphere provided by the product bag. Preferably, the product bag is a flexible container having walls including a barrier to water transmission so that loss of water from the product is significantly retarded, or even substantially prevented. For example, the flexible container can be formed from a plastic membrane impervious to water. The plastic membrane can comprise polypropylene sheet reinforced with nylon mesh, and be of the type employed as liners for landfills to retard or prevent flow of ground water through the wastes stored in the landfill. Preferably, the coated balls are retained within the flexible containers or product bags for at least a time sufficient to cure the cementitious coating on the balls to a predetermined compressive strength.

Both the first lowboy trailer 66 on which the treatment section 10 is mounted and second lowboy trailer 154 on which the bagging plant 152 is mounted are positioned and aligned on site, near the source of the untreated residue 20, and are each jacked up on a plurality of trailer jacks 188 for stability.

A diesel generator 190 and a diesel fuel tank 192 are mounted on the first lowboy trailer 66. The generator 190 and fuel tank 192 each have sufficient capacity to provide the energy required to operate the apparatus and carry out the entire process. Optionally, power can be obtained from the local power grid.

Figure 9:
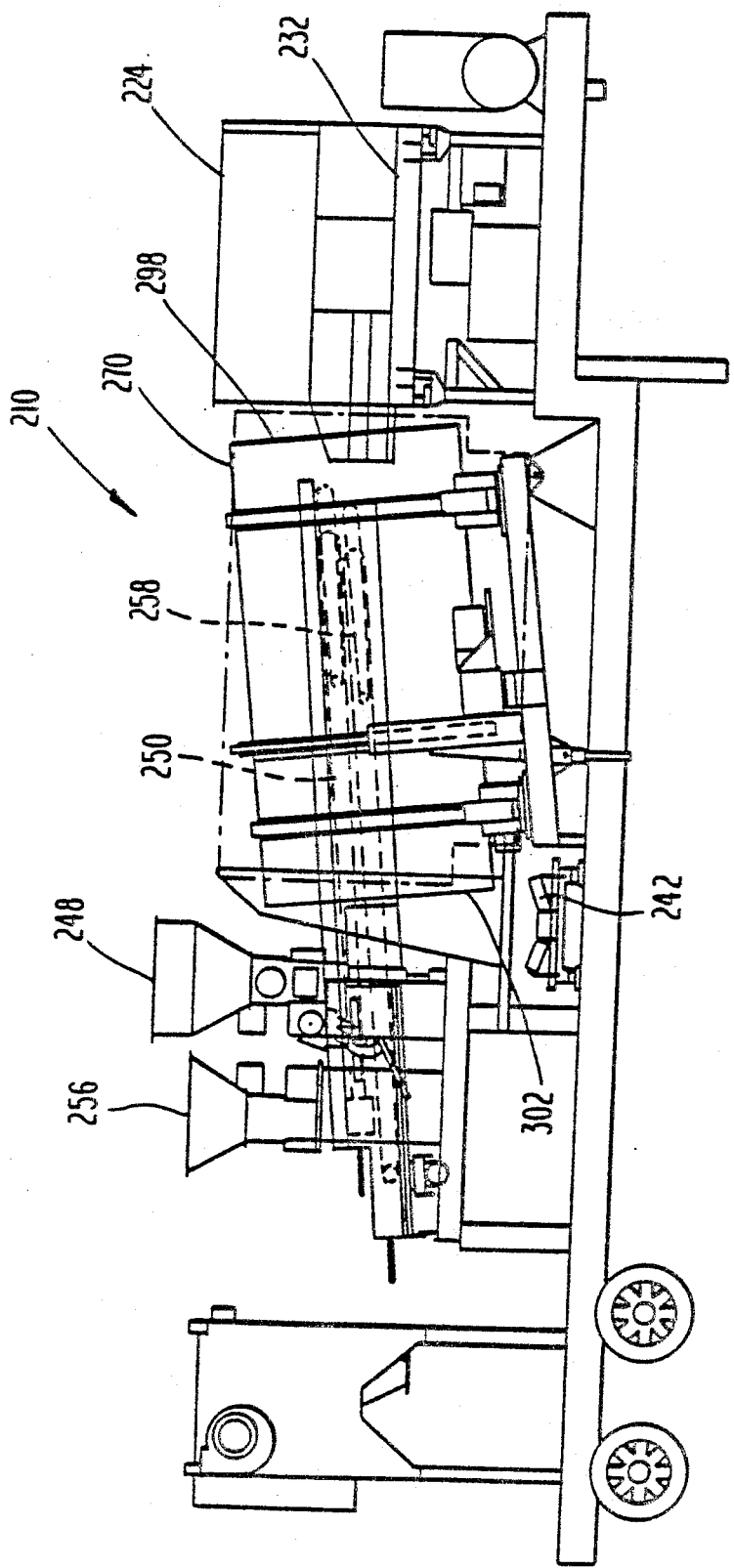
FIG. 9 is a side elevational view of a second, presently preferred embodiment of an apparatus for treating residues according to the process of the present invention.

FIG. 9 illustrates a second, presently preferred embodiment of the apparatus of the present invention, including a trailer-mounted treatment unit 210.

In this embodiment a incinerator residue feed device 224 is positioned proximate the inlet 298 to the rotatable mixing drum 270. A heavy metals treatment agent conveyor 250 and a Portland cement conveyor 258 extend from respective feed hoppers 248, 256 positioned proximate the outlet 302 of the rotatable mixing drum 270 through the drum 270 to deliver heavy metals treatment agent and Portland cement inside the drum 270 proximate the drum inlet 298. Untreated incinerator residue is delivered to a first reciprocating floor conveyor (not shown). The untreated incinerator residue moves up the first reciprocating floor conveyor at an angle of from about 7 to 10 degrees and falls onto a second reciprocating floor conveyor 232, which extends into the inlet of the drum 270 and delivers the untreated incinerator residue to the drum 270 at a point just inside the drum inlet 298. Excess moisture in the untreated incinerator residue drains down the incline of the first reciprocating floor conveyor. The excess moisture is collected and pumped back to the quench tank of the incinerator (not shown).

The combination of the first and second reciprocating floor conveyors has a maximum design-rated capacity of 43 tons per hour. Load cells (not shown) under the second reciprocating floor conveyor 232 monitor the weight of the incoming untreated incinerator residue. When a predetermined weight is reached (e.g. 2,200-3,300 kg) the second reciprocating floor conveyor 232 begins to deliver untreated incinerator residue into the drum 270. The untreated incinerator residue is thoroughly mixed in the rotating drum 270 with the heavy metals treatment agent delivered by the heavy metals treatment agent conveyor 250 in the initial twenty-five percent of the length of the drum 270. Next, Portland Cement is added to the mixture of untreated incinerator residue and heavy metals treatment agent, the Portland cement being delivered by the Portland cement conveyor 258. The coated uncured product balls roll out the outlet 302 of the rotating drum 270 and fall onto a discharge conveyor 242 which transfers the product away from the unit 210 to a stockpile (not shown).

The following examples are illustrative of the process and compositions of the present invention and will be useful to those of ordinary skill in the art in practicing the invention. However, the invention is in no way limited by these examples. Unless otherwise indicated all percentages are given on a weight basis in the following examples.

EXAMPLE 1

The process of the present invention was carried out on a laboratory scale as follows:

22.7 kg of untreated incinerator residue obtained from the Philadelphia Northwest Incinerator facility was added to the rotary drum of a portable cement mixer having a capacity of about 120 kg. An O'Haus digital balance was used to weigh materials. After about 30 seconds a predetermined amount of Celiteg ® FC diatomaceous clay, available from Manville Corp. Denver, Co., was sprinkled over the incinerator residue to promote thorough mixing of the untreated incinerator residue and the diatomaceous clay. Next, a predetermined amount of Type II Portland cement, available from Norval Cement A/S, a quick-set type of Portland cement, was rapidly added to the mixture of untreated incinerator residue and diatomaceous clay, and mixing was continued for one minute. A 4.5 kg sample of product was withdrawn from the mixer, and mixing was continued for another minute, after which another 4.5 kg sample was taken. Mixing was once again continued for another minute, and a final 4.5 kg sample was taken. A series of products were made according to an experimental design with three independent variables: percent cement, percent clay and mixing time. Products including 7, 14, and 21 percent by weight of untreated incinerator residue of cement and 0 and 2 percent clay were prepared. Mixing times in the cement mixer were 1, 2, and 3 minutes. The products were allowed to cure for one week.

The product obtained when diatomaceous clay was used was gray, and separated easily into discrete spheres having diameters of 0.953 cm and smaller.

Screening and classification tests show that the encapsulating spheres are formed in very small sizes and persisted throughout the mixture.

The average composition of the products was about 1000 g incinerator residue, 140 g Portland cement, and 10 g diatomaceous earth. Density of the incinerator residue before treatment is estimated at 1 $g/cm^3$. Density of product after treatment is estimated at 1.6 $g/cm^3$.

After curing, 0.9 kg samples were taken from the mixture for particle size screening and laboratory analyses.

Screen weight distributions were measured for the series of laboratory scale product mixes to estimate the particle size distributions of the products. Eight stainless steel ASTM screens were used to classify product fractions. Mesh sizes were 1, 2, 4, 8, 16, 32, 64, and 128 wires per inch. The screening tests showed that the mean particle diameter was approximately 0.127 cm.

Figure 10:
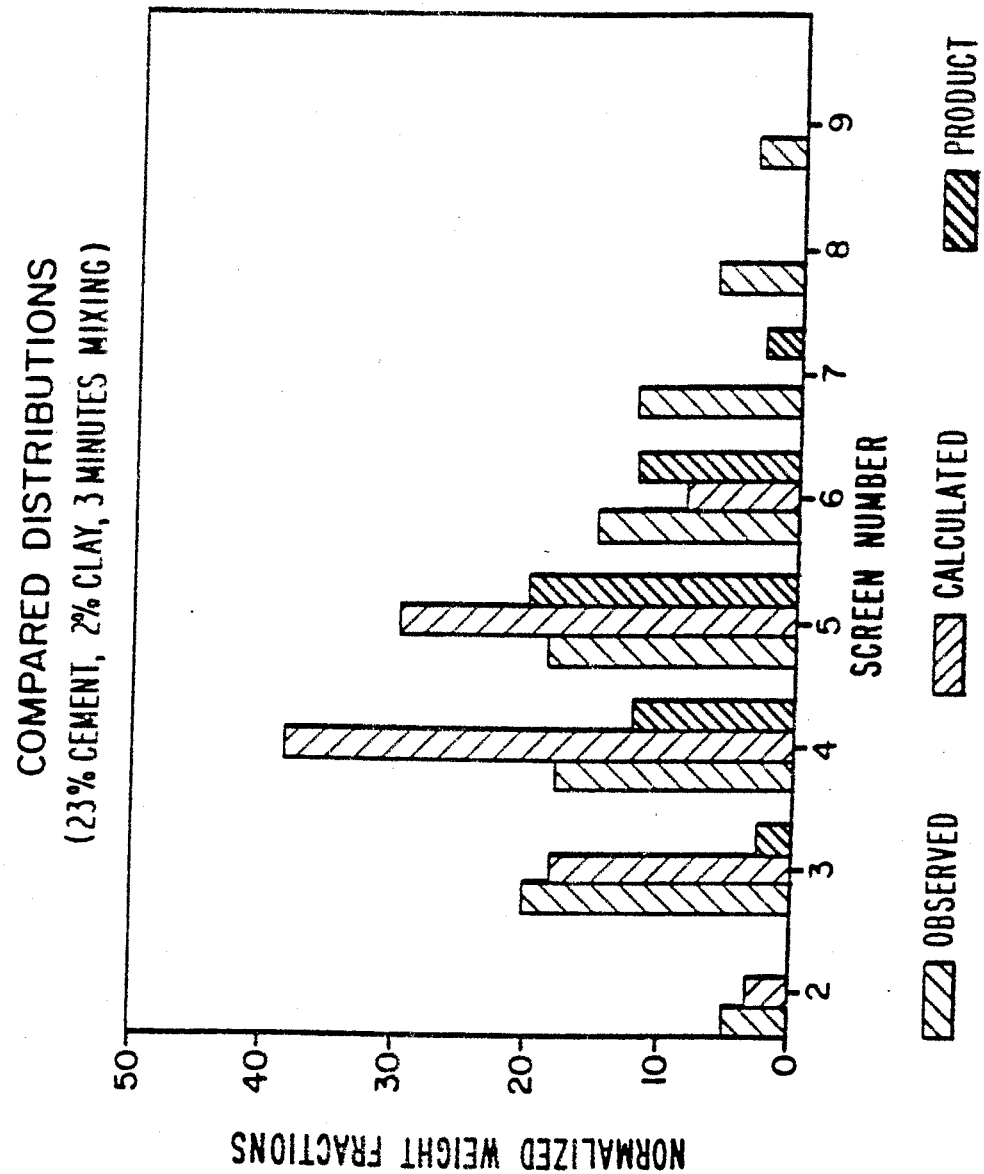
FIG. 10 is a bar graph showing the particle size distribution of product spheres made by the process of the present invention.

An exemplary distribution is shown in FIG. 10. Screen number data on the x axis is the base 2 logarithm of mesh size. Normalized weight fractions are shown on the y axis. CALCULATED estimates the distribution of incinerator residue which can be processed. PRODUCT estimates the distribution of incinerator residue converted to product. Process efficiency is measured as the ratio of the cumulative PRODUCT distribution to the cumulative CALCULATED distribution. This is a practical measure for finding optimal mixes.

In the example shown, process efficiency is about 60 percent. Fines and dust were minimal, and small spheres could be seen in all screen fractions.

A one minute mixing time was found to be preferred over longer times. Product mixed longer than a minute showed some indication that individual balls were beginning to aggregate into larger balls, and additional free water was appearing on the surface of the balls.

Experiments to estimate the effect of the process on the leaching of heavy metals were carried out. Laboratory analyses showed that the leaching of lead and cadmium was 500 to 1,000 times less than that for untreated incinerator residue. Arsenic, barium, chromium, mercury, selenium, and silver showed leaching concentrations from 10 to 50 times less than for untreated incinerator residue.

The product from each trial mixture was analyzed for total heavy metals contained in the untreated residue, and for heavy metals dissolved in a extraction fluid containing acetic acid. The extraction procedure used was the TCLP procedure currently recommended by EPA to estimate leaching of heavy metals from solid waste in landfills. 40 C.F.R. Part 268 (appendix I). TCLP solution #1 was used for extraction of solids. 32 analyses were performed. Solids and extracts were analyzed for eight RCRA metals using inductively coupled plasma and carbon furnace atomic absorption methods.

In the data that follows, average values of metals in untreated incinerator residue and treated product appear first. Then, data on leaching in acid buffer solutions appears. Columns appear side by side to contrast test results for untreated incinerator residue and product.

Calculated data showing percentage extracted and corresponding improvement factors appear in Table II.

TABLE I

TOTAL METALS ANALYSIS
TCLP EXTRACTS[1]

| | Untreated Residue | Screened Product | Untreated Residue | Screened Product |
|---|---|---|---|---|
| arsenic | 10.79 | 6.93 | 0.0010 | 0.0019 |
| barium | 125.49 | 103.24 | 0.5513 | 0.2384 |
| cadmium | 3.20 | 1.33 | 0.1855 | 0.0017 |
| chromium | 42.93 | 38.02 | 0.0462 | 0.0277 |
| lead | 504.00 | 280.50 | 0.7000 | 0.0026 |
| mercury | 0.68 | 0.53 | 0.0172 | 0.0027 |
| selenium | 0.25 | 0.65 | 0.0087 | 0.0024 |
| silver | 1.13 | 0.88 | 0.0023 | 0.0013 |
| pH, final | | | 5.11 | 9.44 |
| pH, initial | | | 4.27 | 6.02 |

[1]Extraction fluid #1: 0.1N acetate buffer (pH = 4.86)

TABLE II

TCLP EXTRACTS[1]

| | Residue Extract Percent | Product Extract Percent | Improvement Factor |
|---|---|---|---|
| arsenic | 0.1483 | 0.4286 | 0.35 |
| barium | 7.0284 | 3.6951 | 1.90 |
| cadmium | 92.8225 | 2.0279 | 45.77 |
| chromium | 1.7239 | 1.1662 | 1.48 |
| lead | 14.9207 | 0.0147 | 1017.24 |
| mercury | 40.3361 | 8.2751 | 4.97 |
| selenium | 56.8528 | 5.9376 | 9.58 |
| silver | 3.2848 | 2.3819 | 1.38 |

[1]Extraction fluid #1: 0.1N acetate buffer (pH = 4.86)

To better present the results, ratios of total metals over extracted metals were calculated and transformed to their logarithms. Response surfaces were then graphed to indicate the changes in leaching factors for lead and cadmium as cement and clay are added to the treatment mixture in varying amounts.

About 14 percent cement and 2 percent clay show the best leaching reduction for lead and cadmium. In the treated product, leaching reduction is about 200 to 2000 times that found for untreated incinerator residue.

Figure 11:
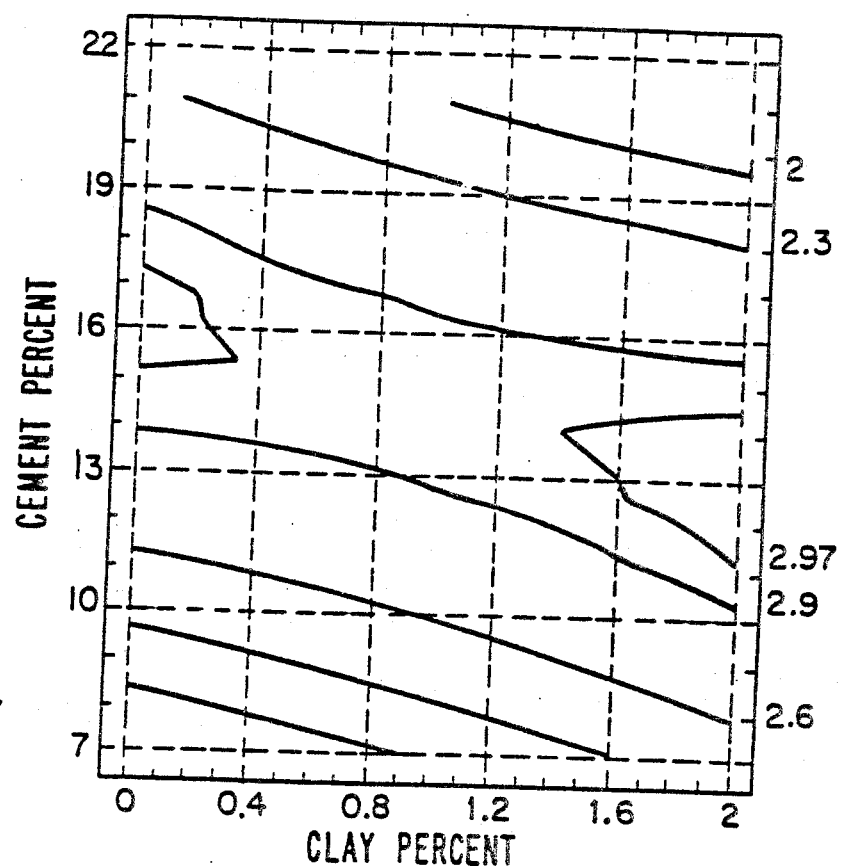
FIG. 11 is a graph illustrating a contour surface for the leaching of cadmium from product spheres made by the process of the present invention.
Figure 12:
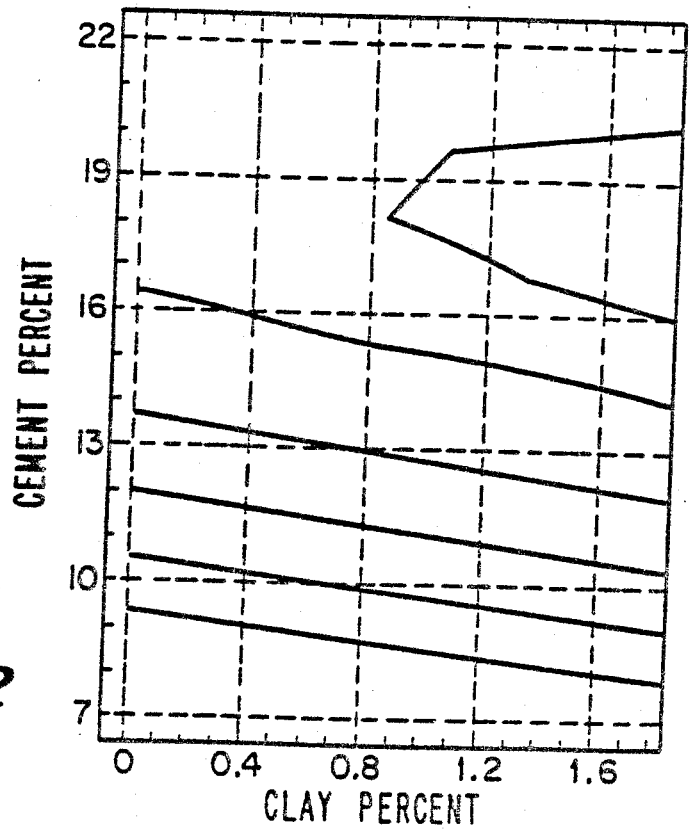
FIG. 12 is a graph illustrating a contour surface for the leaching of lead from product spheres made by the process of the present invention.

Coefficients for plotting response surfaces were computed as linear multiple regression statistics from the laboratory data and are given in Tables III and IV. Response surfaces plotted from the statistics are shown in FIGS. 11 and 12.

TABLE III

Response Surface Coefficients for Cadmium

| Independent variable | Coefficient | Std. error | t-value | Sig. level |
|---|---|---|---|---|
| CONSTANT | −1.262777 | 0.785256 | −1.6081 | 0.1243 |
| CLAYPCT | 0.808594 | 0.259696 | 3.1136 | 0.0057 |
| CHEMCT | 0.522489 | 0.121436 | 4.3026 | 0.0004 |
| CEMSQ | −0.016034 | 0.004249 | −3.7733 | 0.0013 |
| CLAYCEM | −0.054682 | 0.017174 | −3.1841 | 0.0049 |

R-SQ (ADJ.) = 0.4863  SE = 0.480863  MAE = 0.365751  DurbWat = 2.150
24 observations fitted.

TABLE IV

Response Surface Coefficients for Cadmium

| Independent variable | Coefficient | Std. error | t-value | Sig. level |
|---|---|---|---|---|
| CONSTANT | 2.376353 | 0.617386 | 3.8491 | 0.0011 |
| CLAYPCT | 0.116095 | 0.204181 | 0.5686 | 0.5763 |
| CHEMCT | 0.173474 | 0.095477 | 1.8169 | 0.0850 |
| CEMSQ | −0.004542 | 0.003341 | −1.3596 | 0.1899 |
| CLAYCEM | −0.005107 | 0.013502 | −0.3782 | 0.7094 |

R-SQ (ADJ.) = 0.2490  SE = 0.378070  MAE = 0.246159  DurbWat = 2.072
24 observations fitted.

FIG. 11 shows a coutour surface for leaching of cadmium from product spheres. FIG. 12 shows a coutour surface for leaching of lead from product spheres. Numbers on the contour lines are logs of concentration ratios: 1 means 1/10th of total metals leach into extract solutions. 2 means 1/100th leach. 3 means 1/1000th. The highest number show the regions of best leaching improvement.

Various modifications can be made in the details of the embodiments of the apparatus and the process of the present invention, all within the spirit and scope of the invention as defined in the appended claims. For example, the fourth section of the mixing drum could be provided with means for classifying the coated balls into three or more size classes. Similarly, the aggregation agent and/or the cementitious coating material could include one or more accelerators for speeding cure. In addition, or alternatively, means could be provided for accelerating the cure of the cementitious coating on the product balls, for example, means for exposing the coated balls to steam at elevated temperature and pressure.

I claim:

1. Apparatus for treating residue produced by the incineration of commercial, industrial or municipal waste, the apparatus comprising:
   (a) means for mixing the residue with a heavy metals treatment agent;
   (b) means for mixing an aggregation agent with the treated residue;
   (c) means for aggregating the treated residue mixture into balls;
   (d) conveyor means for delivering a cementitious material to a predetermined locus; means for separating the cementitious material delivered to the predetermined locus into a first stream and a second stream;
   (e) a rotatable inclined drum having an upper end and a lower end and means for feeding the residue into the upper end of the inclined drum; the rotatable drum being divided into at least three zones, the means for mixing the residue with the heavy metals treatment agent being provided in a first zone; the means for aggregating the treated residue mixture into balls being provided in a second zone and including means for mixing the first stream of cementitious material with the mixture of residue and heavy metals treatment agent in the second zone; and
   (f) means for providing a cementitious coating on the balls to provide coated balls in a third zone of the drum, including means for mixing the second stream of cementitious material with the balls in the third zone to coat the balls.

2. Apparatus according to claim 1 wherein the rotatable drum further comprises a fourth zone having means for classifying the coated balls by size.

3. Apparatus according to claim 2 wherein the fourth zone comprises a generally cylindrical plate having a plurality of generally uniformly sized apertures, the plate extending outside the lower end of the rotatable drum and having an exterior end, the plate being adapted to permit coated balls of less than a predetermined size pass through the apertures to form a first stream of coated balls, coated balls greater than a predetermined size being retained within the plate and being discharged proximate the external end of the plate.

4. Apparatus according to claim 1 wherein the conveyer means delivers a downwardly falling stream of cementitious material to the predetermined locus within the rotatable drum, the means for dividing the cementitious material comprising means for dividing the falling stream.

5. Apparatus according to claim 4 wherein the means for dividing a falling stream of cementitious material comprises a pair of deflector plates.

* * * * *

UNITED STATES PATENT AND TRADEMARK OFFICE
CERTIFICATE OF CORRECTION

PATENT NO. : 5,037,286

DATED : August 6, 1991

INVENTOR(S) : William A. Roberts

It is certified that error appears in the above-identified patent and that said Letters Patent is hereby corrected as shown below:

Col. 11, line 62, after the words "feed hopper" delete "48" and substitute --46--.

Col. 15, line 32, after the word "efficient" delete "us" and substitute --use--.

Col. 17, line 54, after the word "mixing" delete "drug" and substitute --drum--.

Col. 18, line 68, after the word "mixing" delete "drug" and substitute --drum--.

Col. 19, line 14, after the words "plate member" delete "12" and substitute --128--.

Col. 19, line 43, after the word "omitted" delete "frog" and substitute --from--.

Col. 21, line 47, after the words "amount of" delete "Celiteg®" and substitute --Celite®--.

Signed and Sealed this

Twentieth Day of April, 1993

Attest:

MICHAEL K. KIRK

Attesting Officer

Acting Commissioner of Patents and Trademarks